(12) United States Patent
Sajjadi Mohammadabadi et al.

(10) Patent No.: US 11,648,945 B2
(45) Date of Patent: May 16, 2023

(54) INTERSECTION DETECTION AND CLASSIFICATION IN AUTONOMOUS MACHINE APPLICATIONS

(71) Applicant: NVIDIA Corporation, Santa Clara, CA (US)

(72) Inventors: Sayed Mehdi Sajjadi Mohammadabadi, Santa Clara, CA (US); Berta Rodriguez Hervas, San Francisco, CA (US); Hang Dou, Fremont, CA (US); Igor Tryndin, Fremont, CA (US); David Nister, Bellevue, WA (US); Minwoo Park, Saratoga, CA (US); Neda Cvijetic, East Palo Alto, CA (US); Junghyun Kwon, San Jose, CA (US); Trung Pham, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 613 days.

(21) Appl. No.: 16/814,351

(22) Filed: Mar. 10, 2020

(65) Prior Publication Data
US 2020/0293796 A1 Sep. 17, 2020

Related U.S. Application Data

(60) Provisional application No. 62/816,838, filed on Mar. 11, 2019.

(51) Int. Cl.
*G06V 20/56* (2022.01)
*G06N 3/08* (2023.01)
(Continued)

(52) U.S. Cl.
CPC .......... *G06V 20/588* (2022.01); *B60W 30/09* (2013.01); *B60W 30/095* (2013.01);
(Continued)

(58) Field of Classification Search
CPC .......... G06N 3/0454; G06N 3/08; G06N 3/02; G06N 3/063; G06N 20/10; G06N 20/20;
(Continued)

(56) References Cited

U.S. PATENT DOCUMENTS 7,409,295 B2 8/2008 Paradie
8,204,542 B2 6/2012 Liao et al.
(Continued)

FOREIGN PATENT DOCUMENTS

DE 10 2013 208 521 A1 11/2014
DE 10 2015 221 920 A1 5/2017
(Continued)

OTHER PUBLICATIONS

International Preliminary Report on Patentability received for PCT Application No. PCT/US2020/021894, dated Sep. 23, 2021, 10 pages.
(Continued)

*Primary Examiner* — Babar Sarwar
(74) *Attorney, Agent, or Firm* — Taylor English Duma L.L.P.

(57) ABSTRACT

In various examples, live perception from sensors of a vehicle may be leveraged to detect and classify intersections in an environment of a vehicle in real-time or near real-time. For example, a deep neural network (DNN) may be trained to compute various outputs—such as bounding box coordinates for intersections, intersection coverage maps corresponding to the bounding boxes, intersection attributes, distances to intersections, and/or distance coverage maps associated with the intersections. The outputs may be decoded and/or post-processed to determine final locations of, distances to, and/or attributes of the detected intersections.

25 Claims, 13 Drawing Sheets

(51) Int. Cl.
*G08G 1/01* (2006.01)
*B60W 30/095* (2012.01)
*B60W 60/00* (2020.01)
*B60W 30/09* (2012.01)
*G06V 10/75* (2022.01)

(52) U.S. Cl.
CPC ........... *B60W 60/0011* (2020.02); *G06N 3/08* (2013.01); *G06V 10/751* (2022.01); *G08G 1/0125* (2013.01)

(58) Field of Classification Search
CPC .. G06N 3/0445; G06N 3/0472; G06N 3/0481; G06N 5/003; G06N 7/005; G06N 3/04; G06N 3/084; G06V 10/82; G06V 10/764; G06V 20/588; G06V 20/56; G06V 10/80; G06V 10/454; G06V 20/58; G06V 20/597; G06V 20/647; G06V 40/18; G06V 10/25; G06V 10/751; G06V 10/803; G06V 20/70; B60W 60/001; B60W 2420/42; B60W 2400/00; B60W 2420/52; B60W 2420/54; B60W 30/09; B60W 30/18154; B60W 60/00274; B60W 2520/06; B60W 2540/22; B60W 2540/221; B60W 2540/223; B60W 2540/225; B60W 2552/53; B60W 30/0956; B60W 40/08; B60W 50/14; B60W 2040/0818; B60W 2540/229; B60W 30/095; B60W 40/09; B60W 60/0011; G01C 21/1652; G01C 21/3811; G01C 21/3815; G01C 21/3841; G01C 21/3867; G01C 21/387; G01C 21/3878; G01C 21/3896; G01C 21/30; G01C 21/3602; G01C 21/32; G01S 19/41; G01S 13/86; G01S 13/89; G01S 17/86; G01S 17/89; G01S 19/45; G05D 1/0274; G05D 2201/0213; G06K 9/6288; G06K 9/6289; G06T 2207/30252; G06T 7/33; G08G 1/0125; G08G 1/166
See application file for complete search history.

(56) References Cited

U.S. PATENT DOCUMENTS

| | | | |
|---|---|---|---|
| 8,204,642 B2 | 6/2012 | Tanaka et al. |
| 9,098,751 B2 | 8/2015 | Hilldore et al. |
| 9,373,057 B1 | 6/2016 | Erhan et al. |
| 9,623,905 B2 | 4/2017 | Shashua et al. |
| 9,701,307 B1 | 7/2017 | Newman et al. |
| 9,710,714 B2 | 7/2017 | Chen et al. |
| 9,721,471 B2 | 8/2017 | Chen et al. |
| 9,742,869 B2 | 8/2017 | Bolotin et al. |
| 10,007,269 B1 | 6/2018 | Gray |
| 10,108,867 B1 | 10/2018 | Vallespi-Gonzalez et al. |
| 10,133,274 B2 | 11/2018 | Shashua et al. |
| 10,134,278 B1 | 11/2018 | Konrardy et al. |
| 10,157,331 B1 | 12/2018 | Tang et al. |
| 10,262,213 B2 | 4/2019 | Chen et al. |
| 10,282,995 B2 | 5/2019 | Heinla et al. |
| 10,289,469 B2 | 5/2019 | Fortino et al. |
| 10,372,136 B2 | 8/2019 | Yang et al. |
| 10,380,886 B2 | 8/2019 | Ran et al. |
| 10,489,972 B2 | 11/2019 | Atsmon |
| 10,580,158 B1 | 3/2020 | Mousavian et al. |
| 10,586,456 B2 | 3/2020 | Wang |
| 10,625,748 B1 | 4/2020 | Dong et al. |
| 10,635,110 B2 | 4/2020 | Shashua et al. |
| 10,730,517 B2 | 8/2020 | Park et al. |
| 10,739,778 B2 | 8/2020 | Winkler et al. |
| 10,740,954 B2 | 8/2020 | Liu |
| 10,761,535 B2 | 9/2020 | Chen et al. |
| 10,776,985 B2 | 9/2020 | Liu et al. |
| 10,816,978 B1 | 10/2020 | Schwalb |
| 10,829,116 B2 | 11/2020 | Iagnemma et al. |
| 10,829,793 B2 | 11/2020 | Arikawa et al. |
| 10,832,439 B1 | 11/2020 | Ma et al. |
| 10,885,698 B2 | 1/2021 | Muthler et al. |
| 10,936,902 B1* | 3/2021 | Bagwell .................. G06T 7/143 |
| 10,942,030 B2 | 3/2021 | Haque et al. |
| 10,991,155 B2 | 4/2021 | Bouttefroy et al. |
| 10,997,433 B2 | 5/2021 | Xu et al. |
| 10,997,435 B2 | 5/2021 | Abbott et al. |
| 11,010,907 B1* | 5/2021 | Bagwell .............. G05D 1/0221 |
| 11,042,163 B2 | 6/2021 | Chen et al. |
| 11,170,299 B2 | 11/2021 | Kwon et al. |
| 11,182,916 B2 | 11/2021 | Yang et al. |
| 11,210,537 B2 | 12/2021 | Koivisto et al. |
| 11,321,924 B2 | 5/2022 | Molyneaux et al. |
| 2004/0016870 A1 | 1/2004 | Pawlicki et al. |
| 2004/0252864 A1 | 12/2004 | Chang et al. |
| 2005/0196034 A1 | 9/2005 | Hattori et al. |
| 2007/0154068 A1 | 7/2007 | Stein et al. |
| 2007/0182528 A1 | 8/2007 | Breed et al. |
| 2008/0266396 A1 | 10/2008 | Stein |
| 2009/0088941 A1 | 4/2009 | Tsuchiya et al. |
| 2009/0097704 A1 | 4/2009 | Savidge et al. |
| 2009/0256840 A1 | 10/2009 | Varadhan et al. |
| 2010/0149193 A1 | 6/2010 | Yu |
| 2010/0322476 A1 | 12/2010 | Kanhere et al. |
| 2011/0044557 A1 | 2/2011 | Abraham et al. |
| 2012/0194516 A1 | 8/2012 | Newcombe et al. |
| 2013/0061033 A1 | 3/2013 | Kim et al. |
| 2013/0100286 A1 | 4/2013 | Lao |
| 2013/0106837 A1 | 5/2013 | Mukherjee et al. |
| 2014/0104424 A1 | 4/2014 | Zhang et al. |
| 2015/0054824 A1 | 2/2015 | Jiang |
| 2015/0067672 A1 | 3/2015 | Mitra et al. |
| 2015/0172626 A1 | 6/2015 | Martini |
| 2015/0278578 A1 | 10/2015 | Otsuka et al. |
| 2015/0304634 A1 | 10/2015 | Karvounis |
| 2015/0346716 A1 | 12/2015 | Scharfe et al. |
| 2016/0247290 A1 | 8/2016 | Liu et al. |
| 2016/0321074 A1 | 11/2016 | Hung et al. |
| 2016/0364907 A1 | 12/2016 | Schoenberg |
| 2017/0010108 A1 | 1/2017 | Shashua |
| 2017/0061625 A1 | 3/2017 | Estrada et al. |
| 2017/0061632 A1 | 3/2017 | Lindner et al. |
| 2017/0090478 A1 | 3/2017 | Blayvas et al. |
| 2017/0116781 A1 | 4/2017 | Babahajiani et al. |
| 2017/0124717 A1 | 5/2017 | Baruch et al. |
| 2017/0124758 A1 | 5/2017 | Jia et al. |
| 2017/0177950 A1 | 6/2017 | Hasberg |
| 2017/0220876 A1 | 8/2017 | Gao et al. |
| 2017/0236013 A1 | 8/2017 | Clayton et al. |
| 2017/0259801 A1 | 9/2017 | Abou-Nasr et al. |
| 2017/0270375 A1* | 9/2017 | Grauer .................. G02B 23/12 |
| 2017/0344808 A1 | 11/2017 | El-Khamy et al. |
| 2017/0357862 A1 | 12/2017 | Tatsubori |
| 2017/0371340 A1 | 12/2017 | Cohen et al. |
| 2017/0371346 A1 | 12/2017 | Mei et al. |
| 2018/0089833 A1 | 3/2018 | Lewis et al. |
| 2018/0136332 A1* | 5/2018 | Barfield, Jr. ........... G06V 20/58 |
| 2018/0158244 A1 | 6/2018 | Ybanez Zepeda et al. |
| 2018/0164812 A1 | 6/2018 | Oh et al. |
| 2018/0188059 A1 | 7/2018 | Wheeler et al. |
| 2018/0203959 A1 | 7/2018 | Refsnaes et al. |
| 2018/0232663 A1 | 8/2018 | Ross et al. |
| 2018/0267558 A1 | 9/2018 | Tiwari et al. |
| 2018/0276278 A1 | 9/2018 | Cagan et al. |
| 2018/0300590 A1 | 10/2018 | Briggs et al. |
| 2018/0304468 A1 | 10/2018 | Holz |
| 2018/0348374 A1 | 12/2018 | Laddha et al. |
| 2018/0349746 A1 | 12/2018 | Vallespi-Gonzalez |
| 2018/0370540 A1 | 12/2018 | Yousuf et al. |
| 2018/0373980 A1 | 12/2018 | Huval |
| 2019/0016285 A1 | 1/2019 | Freienstein et al. |
| 2019/0050993 A1* | 2/2019 | Jang .................. B60W 30/12 |
| 2019/0061771 A1 | 2/2019 | Bier et al. |
| 2019/0065933 A1 | 2/2019 | Bogdoll et al. |

(56) References Cited

U.S. PATENT DOCUMENTS

| | | |
|---|---|---|
| 2019/0066328 A1 | 2/2019 | Kwant et al. |
| 2019/0071101 A1 | 3/2019 | Emura et al. |
| 2019/0080467 A1 | 3/2019 | Hirzer et al. |
| 2019/0101399 A1 | 4/2019 | Sunil Kumar et al. |
| 2019/0102646 A1 | 4/2019 | Redmon et al. |
| 2019/0102668 A1 | 4/2019 | Yao et al. |
| 2019/0120640 A1 | 4/2019 | Ho et al. |
| 2019/0129831 A1 | 5/2019 | Goldberg |
| 2019/0146497 A1 | 5/2019 | Urtasun et al. |
| 2019/0146500 A1 | 5/2019 | Yalla et al. |
| 2019/0147600 A1 | 5/2019 | Karasev et al. |
| 2019/0147610 A1 | 5/2019 | Frossard et al. |
| 2019/0171912 A1 | 6/2019 | Vallespi-Gonzalez et al. |
| 2019/0179979 A1 | 6/2019 | Melick |
| 2019/0189001 A1 | 6/2019 | Smothers et al. |
| 2019/0197774 A1 | 6/2019 | Molyneaux et al. |
| 2019/0213481 A1 | 7/2019 | Godard et al. |
| 2019/0235515 A1 | 8/2019 | Shirvani et al. |
| 2019/0243371 A1 | 8/2019 | Nister et al. |
| 2019/0250622 A1 | 8/2019 | Nister et al. |
| 2019/0251442 A1 | 8/2019 | Koivisto et al. |
| 2019/0258251 A1 | 8/2019 | Ditty et al. |
| 2019/0286153 A1 | 9/2019 | Rankawat et al. |
| 2019/0295282 A1 | 9/2019 | Smolyanskiy et al. |
| 2019/0302761 A1 | 10/2019 | Huang et al. |
| 2020/0013176 A1 | 1/2020 | Kang et al. |
| 2020/0026960 A1* | 1/2020 | Park ................ G06V 10/955 |
| 2020/0080849 A1 | 3/2020 | Ondruska et al. |
| 2020/0117213 A1 | 4/2020 | Tian et al. |
| 2020/0117898 A1 | 4/2020 | Tian et al. |
| 2020/0143205 A1 | 5/2020 | Yao et al. |
| 2020/0160559 A1 | 5/2020 | Urtasun et al. |
| 2020/0175311 A1 | 6/2020 | Xu et al. |
| 2020/0210726 A1 | 7/2020 | Yang et al. |
| 2020/0211394 A1* | 7/2020 | King ................... G06V 20/58 |
| 2020/0218979 A1* | 7/2020 | Kwon .................. G06V 20/56 |
| 2020/0226720 A1* | 7/2020 | Mirzaei Domabi ..... G06N 3/04 |
| 2020/0238991 A1* | 7/2020 | Aragon ................ G06V 10/22 |
| 2020/0242378 A1* | 7/2020 | Kim .................. G01C 21/3602 |
| 2020/0249684 A1* | 8/2020 | Onofrio .............. G06N 3/0454 |
| 2020/0250470 A1* | 8/2020 | Kim ................. H04N 5/232127 |
| 2020/0257306 A1 | 8/2020 | Nisenzon |
| 2020/0341466 A1 | 10/2020 | Pham et al. |
| 2020/0349365 A1* | 11/2020 | Behrendt ............ B60W 30/143 |
| 2020/0410254 A1 | 12/2020 | Pham et al. |
| 2021/0004589 A1* | 1/2021 | Turkelson .............. G06V 20/00 |
| 2021/0025696 A1 | 1/2021 | Goto et al. |
| 2021/0063198 A1 | 3/2021 | Nister et al. |
| 2021/0063199 A1 | 3/2021 | Akbarzadeh et al. |
| 2021/0064980 A1 | 3/2021 | Heinrich et al. |
| 2021/0089794 A1 | 3/2021 | Chen et al. |
| 2021/0150722 A1 | 5/2021 | Homayounfar et al. |
| 2021/0272304 A1* | 9/2021 | Yang ..................... G06V 10/70 |
| 2021/0286923 A1 | 9/2021 | Kristensen et al. |
| 2021/0300379 A1 | 9/2021 | Hackeloeer et al. |
| 2022/0132145 A1 | 4/2022 | Choi et al. |

FOREIGN PATENT DOCUMENTS

| | | | |
|---|---|---|---|
| DE | 10 2015 226 762 A1 | 6/2017 | |
| EP | 1 930 863 A2 | 6/2008 | |
| EP | 1 930 868 A1 | 6/2008 | |
| EP | 2 384 009 A2 | 11/2011 | |
| EP | 3 171 297 A1 | 5/2017 | |
| EP | 3441909 | 2/2019 | |
| EP | 3441909 A1 * | 2/2019 | ............ B60W 30/12 |
| KR | 10-2012-0009590 A | 2/2012 | |
| WO | 2012/011713 A2 | 1/2012 | |
| WO | 2016/183074 A1 | 11/2016 | |
| WO | 2017/177128 A1 | 10/2017 | |
| WO | 2017/220705 A1 | 12/2017 | |
| WO | 2018/002910 A1 | 1/2018 | |
| WO | 2018/102717 A1 | 6/2018 | |
| WO | 2018/104563 A2 | 6/2018 | |
| WO | 2018/193254 A1 | 10/2018 | |

OTHER PUBLICATIONS

"Methodology of Using a Single Controller (ECU) for a Fault-Tolerant/Fail-Operational Self-Driving System", U.S. Appl. No. 62/524,283, filed Jun. 23, 2017.

"Systems and Methods for Safe and Reliable Autonomous Vehicles", U.S. Appl. No. 62/584,549, filed Nov. 10, 2017.

"System and Method for Controlling Autonomous Vehicles", U.S. Appl. No. 62/614,466, filed Jan. 17, 2018.

"System and Method for Safe Operation of Autonomous Vehicles", U.S. Appl. No. 62/625,351, filed Feb. 2, 2018.

"Conservative Control for Zone Driving of Autonomous Vehicles", U.S. Appl. No. 62/628,831, filed Feb. 9, 2018.

"Systems and Methods for Sharing Camera Data Between Primary and Backup Controllers in Autonomous Vehicle Systems", U.S. Appl. No. 62/629,822, filed Feb. 13, 2018.

"Pruning Convolutional Neural Networks for Autonomous Vehicles and Robotics", U.S. Appl. No. 62/630,445, filed Feb. 14, 2018.

"Methods for accurate real-time object detection and for determining confidence of object detection suitable for Autonomousvehicles", U.S. Appl. No. 62/631,781, filed Feb. 18, 2018.

"System and Method for Autonomous Shuttles, Robo-Taxis, Ride-Sharing and On-Demand Vehicles", U.S. Appl. No. 62/635,503, filed Feb. 26, 2018.

"Methods for Accurate Real-time Lane and Road Boundary Detection for Autonomous Driving", U.S. Appl. No. 62/636,142, filed Feb. 27, 2018.

"Convolutional Neural Networks to Detect Drivable Freespace for Autonomous Vehicles", U.S. Appl. No. 62/643,665, filed Mar. 15, 2018.

"Energy Based Reflection Filter for Denoising Ray-Traced Glossy Reflections", U.S. Appl. No. 62/644,386, filed Mar. 17, 2018.

"Geometric Shadow Filter for Denoising Ray-Traced Shadows", U.S. Appl. No. 62/644,385, filed Mar. 17, 2018.

"Adaptive Occlusion Sampling of Rectangular Area Lights with Voxel Cone Tracing", U.S. Appl. No. 62/644,806, filed Mar. 19, 2018.

"Distance Based Ambient Occlusion Filter for Denoising Ambient Occlusions", U.S. Appl. No. 62/644,601, filed Mar. 19, 2018.

"Deep Neural Network for Estimating Depth from Stereo Using Semi-Supervised Learning", U.S. Appl. No. 62/646,148, filed Mar. 21, 2018.

"Video Prediction Using Spatially Displaced Convolution", U.S. Appl. No. 62/646,309, filed Mar. 21, 2018.

"Video Prediction Using Spatially Displaced Convolution", U.S. Appl. No. 62/647,545, filed Mar. 23, 2018.

"Network Injection Rate Limiting", U.S. Appl. No. 62/648,326, filed Mar. 26, 2018.

"Network Synchronization Using Posted Operation Tracking for Flush Semantics", U.S. Appl. No. 62/648,333, filed Mar. 26, 2018.

"System and Methods for Advanced AI-Assisted Vehicles", U.S. Appl. No. 62/648,358, filed Mar. 26, 2018.

"Method and System of Remote Operation of a Vehicle Using an Immersive Virtual Reality Environment", U.S. Appl. No. 62/648,493, filed Mar. 27, 2018.

"System and Method for Training, Testing, Verifying, and Validating Autonomous and Semi-Autonomous Vehicles", U.S. Appl. No. 62/648,399, filed Mar. 27, 2018.

"System and Methods for Virtualized Intrusion Detection and Prevent System in Autonomous Vehicles", U.S. Appl. No. 62/682,803, filed Jun. 8, 2018.

"Deep Learning for Path Detection in Autonomous Vehicles", U.S. Appl. No. 62/684,328, filed Jun. 13, 2018.

"Methods for High-Precision, High-Accuracy Lane Detection in Autonomous Driving Applications", U.S. Appl. No. 62/699,669, filed Jul. 17, 2018.

"Distance to Obstacle Detection in Autonomous Driving Applications", U.S. Appl. No. 62/786,188, filed Dec. 28, 2018.

"Detection and Classification of Wait Conditions in Autonomous Driving Applications", U.S. Appl. No. 62/816,838, filed Mar. 11, 2019.

(56) References Cited

OTHER PUBLICATIONS

"Intersection Detection and Handling Using Live Perception in Autonomous Driving Applications", U.S. Appl. No. 62/839,155, filed Apr. 26, 2019.
"Intersection Contention Area Detection Using Live Perception in Autonomous Driving Applications", U.S. Appl. No. 62/866,158, filed Jun. 25, 2019.
"Lidar range Image Processing for Autonomous Vehicle Applications", U.S. Appl. No. 62/893,814, filed Aug. 30, 2019.
Yang, Z., "Research on Lane Recognition Algorithm Based on Deep Learning", International Conference on Artificial Intelligence and Advanced Manufacturing (AIAM), IEEE, pp. 387-391 (2019).
Yao, J., et al., "Estimating Drivable Collision-Free Space From Monocular Video," IEEE Winter Conference on Applications of Computer Vision (WACV), pp. 1-10 (2015).
Zbontar, J., and Lecun, Y., "Stereo Matching by Training a Convolutional Neural Network to Compare Image Patches", Journal of Machine Learning Research, vol. 17, pp. 1-32 (2016).
Zhao, H., et al., "Loss Functions for Image Restoration With Neural Networks", IEEE Transactions on Computational Imaging, vol. 3, No. 1, pp. 1-11 (Mar. 2017).
Zhong, Y., et al., "Self-Supervised Learning for Stereo Matching With Self-Improving Ability", arXiv:1709.00930v1 [cs.CV], pp. 1-13 (Sep. 4, 2017).
Invitation to pay additional fees received for PCT Application No. PCT/US2019/018348, dated May 29, 2019, 18 pages.
Invitation to pay additional fees received for PCT Application No. PCT/US2019/019656, dated May 31, 2019, 9 pages.
International Search Report and Written Opinion dated Jun. 26, 2019 in International Application No. PCT/US2019/024400, 11 pages.
Invitation to pay additional fees received for PCT Application No. PCT/US2019/022592, dated Jun. 26, 2019, 9 pages.
International Search Report and Written Opinion received for PCT Patent Application No. PCT/US2019/019656, dated Jul. 24, 2019, 14 pages.
International Search Report and Written Opinion received for PCT Patent Application No. PCT/US2019/018348, dated Jul. 25, 2019, 21 pages.
International Search Report and Written Opinion received for PCT Patent Application No. PCT/US2019/022592, dated Aug. 26, 2019, 14 pages.
International Search Report and Written Opinion dated Oct. 18, 2019 in International Patent Application No. PCT/US2019/042225, 11 pages.
International Search Report and Written Opinion dated Nov. 7, 2019 in International Patent Application No. PCT/US2019/022753, 18 Pages.
International Search Report and Written Opinion received for PCT Patent Application No. PCT/US2019/068764, dated Apr. 22, 2020, 15 pages.
International Search Report and Written Opinion received for PCT Patent Application No. PCT/US2019/068766, dated Apr. 22, 2020, 13 pages.
Invitation to pay additional fees received for PCT Patent Application No. PCT/US2020/021894, dated Jun. 9, 2020, 9 pages.
Invitation to pay additional fees received for PCT Application No. PCT/US2020/028116, dated Jul. 21, 2020, 12 pages.
International Preliminary Report on Patentability received for PCT Application No. PCT/US2019/018348, dated Aug. 27, 2020, 16 pages.
International Preliminary Report on Patentability received for PCT Application No. PCT/US2019/019656, dated Sep. 3, 2020, 11 pages.
International Search Report and Written Opinion received for PCT Patent Application No. PCT/US2020/028116, dated Sep. 11, 2020, 17 pages.
International Preliminary Report on Patentability received for PCT Application No. PCT/US2019/022592, dated Sep. 24, 2020, 11 pages.
International Preliminary Report on Patentability received for PCT Application No. PCT/US2019/022753, dated Oct. 1, 2020, 14 pages.
International Preliminary Report on Patentability received for PCT Application No. PCT/US2019/024400, dated Oct. 8, 2020, 10 pages.
International Search Report and Written Opinion received for PCT Patent Application No. PCT/US2020/039430, dated Oct. 9, 2020, 13 pages.
International Search Report and Written Opinion received for PCT Patent Application No. PCT/US2020/048786, dated Nov. 12, 2020, 13 pages.
International Preliminary Report on Patentability received for PCT Patent Application No. PCT/US2019/042225, dated Jan. 28, 2021, 9 pages.
International Search Report and Written Opinion received for PCT Patent Application No. PCT/US2020/062869, dated Mar. 17, 2021, 11 pages.
International Preliminary Report on Patentability received for PCT Application No. PCT/US2019/068764, dated Jul. 8, 2021, 12 pages.
International Preliminary Report on Patentability received for PCT Application No. PCT/US2019/068766, dated Jul. 8, 2021, 10 pages.
International Preliminary Report on Patentability received for PCT Application No. PCT/US2020/028116, dated Nov. 4, 2021, 14 pages.
International Preliminary Report on Patentability received for PCT Application No. PCT/US2020/039430, dated Jan. 6, 2022, 12 pages.
International Preliminary Report on Patentability received for PCT Application No. PCT/US2020/048786, dated Mar. 10, 2022, 11 pages.
"Euler spiral", Wikipedia, Retrieved from Internet URL : https://en.wikipedia.org/wiki/Euler_spiral, accessed on Feb. 21, 2019, pp. 10.
"F1 score", Wikipedia, Retrieved from Internet URL : https://en.wikipedia.org/wiki/F-score, accessed on Feb. 21, 2019, pp. 3.
"Implementation of Control Flow in TensorFlow" TensorFlow Authors, Retrieved from the Internet URL : http://download.tensorflow.org/paper/white_paper_tf_control_flow_implementation_2017_11_1.pdf, pp. 1-18 (Nov. 1, 2016).
"Neural Networks", Retrieved from Internet URL : https://www.tensorflow.org/api_guides/python/nn#conv2d_transpose, accessed on Mar. 1, 2019, pp. 14.
"Polynomial curve fitting", Retrieved from Internet URL : https://www.mathworks.com/help/matlab/ref/polyfit.html, accessed on Feb. 21, 2019, pp. 13.
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
"Tensorflow". Retrieved from the Internet URL :https://github.com/tensorflow/tensorflow/blob/master/tensorflow/core/kernels/hinge-loss.h, accessed on May 16, 2019, pp. 1-4.
"Tf.while_loop much slower than static graph? #9527", tensorflow, Retrieved from the Internet URL : https://github.com/tensorflow/tensorflow/issues/9527,accessed on May 16, 2019, pp. 1-7.
"Tf.losses.get_regularization_loss", TensorFlow Core 1.13, Retrieved from the Internet URL : https://www.tensorflow.org/api_docs/python/tf/losses/get_regularization_loss, accessed on May 16, 2019, pp. 1-1.
What is polyline?, Webopedia Definition, Retrieved from Internet URL : https://www.webopedia.com/TERM/P/polyline.html, accessed on Feb. 21, 2019, pp. 4.
"What are deconvolutional layers?", Data Science Stack Exchange, Retrieved from Internet URL : https://datascience.stackexchange.

(56) References Cited

OTHER PUBLICATIONS com/questions/6107/what%E2%80%90are%E2%80%90deconvolutional%E2%80%90layers, accessed on Feb. 21, 2019, pp. 21.
Allison, R. S., et al., "Binocular depth discrimination and estimation beyond interaction space", Journal of Vision, vol. 9, No. 1, pp. 1-14 (Jan. 2009).
Alvarez, J. M., et al., "Road Scene Segmentation from a Single Image", In Proceedings of the 12th European Conference on Computer Vision—vol. Part VII, ECCV'12, pp. 376-389 (2012).
Asvadi, A., et al.,"DepthCN: Vehicle detection using 3D-LIDAR and ConvNet", IEEE 20th International Conference on Intelligent Transportation Systems (ITSC), pp. 1-6 (2017).
Bach, M., et al., "Multi-Camera Traffic Light Recognition Using a Classifying Labelled Multi-Bernoulli Filter", In 2017 IEEE Intelligent Vehicles Symposium (IV), pp. 1045-1051 (Jun. 11-14, 2017).
Badino, H., et al., "Free Space Computation Using Stochastic Occupancy Grids and Dynamic Programming", Worshop on Dynamical Vision at ICCV, pp. 1-12 (Oct. 2007).
Badino, H., et al., "The Stixel World—A Compact Medium Level Representation of the 3d-World", In DAGM, pp. 1-10 (2009).
Benenson, R., et al., "Stixels Estimation Without Depth Map Computation", In ICCV, pp. 1-8 (2011).
Bidlack, C. et al., "Visual Robot Navigation Using Flat Earth Obstacle Projection", Proceedings of the IEEE International Conference on Robotics and Automation, pp. 3374-3381 (May 8, 1994).
Bojarski, M., et al.,"End to End Learning for Self-Driving Cars", arXiv: 1604.07316v1 [cs.CV], XP055570062, Retrieved from the Internet URL: https://nvidia.com/content/tegra/automotive/images/2016/solutions/pdf/end-to-end-dl-using-px.pdf, pp. 1-9 (Apr. 25, 2016).
Borland, D., and Taylor II, R. M., "Rainbow Color Map (Still) Considered Harmful", IEEE Computer Graphics and Applications, vol. 27, No. 2, pp. 1-17 (Mar./Apr. 2007).
Brust, C. A., et al., "Convolutional Patch Networks With Spatial Prior for Road Detection and Urban Scene Understanding", In International Conference on Computer Vision Theory and Applications (VISAPP), arXiv:1502.06344v1 [cs.CV], pp. 1-9 (Feb. 23, 2015).
Chen, J., et al., "FOAD: Fast Optimization-based Autonomous Driving Motion Planner", 2018 Annual American Control Conference (ACC), IEEE, pp. 1-8 (Jun. 27-29, 2018).
Cheng, G., et al., "Automatic Road Detection and Centerline Extraction via Cascaded End-to-End Convolutional Neural Network, IEEE Transactions on Geoscience and Remote Sensing" vol. 55, No. 6, pp. 3322-3337 (Jun. 1, 2017).
Chilamkurthy, S., "A 2017 Guide to Semantic Segmentation with Deep Learning", Qure.ai Blog, Retrieved from Internet URL : http://blog.qure.ai/notes/semantic-segmentation-deep-learning-review, accessed on Feb. 21, 2019, pp. 16 (Jul. 5, 2017).
Clevert, D.-A., et al.,"Fast and Accurate Deep Network Learning by Exponential Linear Units (ELUs)", ICLR 2016, pp. 1-14 (Feb. 22, 2016).
Cormack, R. H., "Stereoscopic depth perception at far viewing distances, Perception & Psychophysics", vol. 35, No. 5, pp. 423-428 (Sep. 1984).
Deshpande, A., "A Beginner's Guide to Understanding Convolutional Neural Networks", accessed at: https://adeshpande3.github.io/A-Beginner's-Guide-To-Understanding-Convolutional-Neural-Networks/, Accessed on Feb. 21, 2019, pp. 1-13.
Dipietro, R., "A Friendly Introduction to Cross-Entropy Loss," Version 0.1, Accessed on Feb. 21, 2019 at: https://rdipietro.github.io/friendly-intro-to-cross-entropy-loss/, pp. 1-10 (May 2, 2016).
Du, L., and Du, Y., "Hardware Accelerator Design for Machine Learning", Machine Learning-Advanced Techniques and Emerging Applications, pp. 1-14 (2017).
Eigen,D., et al., "Depth Map Prediction from a Single Image using a Multi-Scale Deep Network", NIPS, pp. 1-9, (2014).

Elfes, A., "Sonar-Based Real-World Mapping and Navigation", IEEE Journal on Robotics and Automation, vol. 3, Issue: 3, pp. 249-265 (Jun. 1987).
Foley, D., and Danskin, J., "Ultra-Performance Pascal GPU and NVLink Interconnect," IEEE Computer Society, IEEE Micro, vol. 37, No. 2, pp. 1-11 (Mar./Apr. 2017).
Franke, U., and Kutzbach., I., "Fast Stereo Based Object Detection for Stop & Go Traffic", pp. 1-6 (1996).
Fukunaga, K., and Hostetler, L., "The estimation of the gradient of a density function, with applications in pattern recognition", IEEE Transactions on Information Theory, vol. 21, No. 1, pp. 32-40 (Jan. 1975).
Gao, J., et al., "Embedding Structured Contour and Location Prior in Siamesed Fully Convolutional Networks for Road Detection", in IEEE Transactions on Intelligent Transportation Systems, vol. 19, No. 1, pp. 1-6 (Jan. 2018).
Garg, R., et al., "Unsupervised CNN for Single View Depth Estimation: Geometry to the Rescue", ECCV 2016, pp. 1-16 (Jul. 29, 2016).
Garnett, N., et al., "Real-Time Category-Based and General Obstacle Detection for Autonomous Driving", IEEE International Conference on Computer Vision Workshops (ICCVW), IEEE, pp. 198-205 (2017).
Geiger, A., et al., "Vision meets Robotics: The KITTI Dataset", The International Journal of Robotics Research, pp. 1-6 (2013).
Gidaris, S., and Komodakis, N., "Detect, Replace, Refine: Deep Structured Prediction for Pixel Wise Labeling", Computer Vision and Pattern Recognition, pp. 1-21 (Dec. 14, 2016).
Godard, C., et al.,"Unsupervised Monocular Depth Estimation with Left-Right Consistency", IEEE Computer Society Conference on Computer Vision and Pattern Recognition, pp. 270-279 (Jul. 21, 2017).
Gregory, R. L., "Eye and brain : The psychology of seeing", World University Library, pp. 130 (1966) (PART 1).
Gregory, R. L., "Eye and brain : The psychology of seeing", World University Library, pp. 130 (1966) (PART 2).
Guney, F., et al., Displets: Resolving Stereo Ambiguities using Object Knowledge:, IEEE Conference on Computer Vision and Pattern Recognition (CVPR), pp. 1-11 (Jun. 7-12, 2015).
Han, S., et al., "Learning Both Weights and Connections for Efficient Neural Networks", arXiv:1506.02626v3 [cs.NE], pp. 1-9 (Oct. 30, 2015).
Hartley, R., and Zisserman, A., "Multiple View Geometry in Computer Vision", Cambridge University Press, pp. 1-48 (2004).
He, K., et al., "Deep Residual Learning for Image Recognition", Proceedings of IEEE, Conference on Computer Vision and Pattern Recognition (CVPR), pp. 770-778 (2016).
He, L., et al., "Learning Depth from Single Images with Deep Neural Network Embedding Focal Length", arXiv:1803.10039v1 [cs.CV], pp. 1-14 (Mar. 27, 2018).
Hibbard, P. B., et al., "Magnitude, precision, and realism of depth perception in stereoscopic vision", Cognitive Research: Principles and Implications, vol. 2, pp. 1-11 (2017).
Hirschmuller, H.,"Stereo Processing by Semiglobal Matching and Mutual Information", IEEE Transactions on Pattern Analysis and Machine Intelligence, pp. 1-14 (2008).
Huval, Brody et al., "An Empirical Evaluation of Deep Learning on Highway Driving", Apr. 17, 2015, 7 pages. Available at: https://arxiv.org/pdf/1504.01716.pdf.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
Ioffe, S., and Szegedy, C., "Batch Normalization: Accelerating Deep Network Training by Reducing Internal Covariate Shift", arXiv:1502.03167v3 [cs.LG], pp. 1-12 (Mar. 2, 2015), Available at: https://arxiv.org/abs/1502.03167.
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
Jaderberg, M., et al., "Spatial Transformer Networks", NIPS, pp. 1-9 (2015).

(56) References Cited

OTHER PUBLICATIONS

Jayaraman, A. et al., "Creating 3D Virtual Driving Environments for Simulation-Aided Development of Autonomous Driving and Active Safety", SAE Technical Paper Series, vol. 1, pp. 1-6 (Mar. 28, 2017).

John, V., et al., "Real-time road surface and semantic lane estimation using deep features", Signal, Image and Video Processing, vol. 12, pp. 1133-1140 (Mar. 8, 2018).

Kendall, A., et al.,"End-to-end Learning of Geometry and Context for Deep Stereo Regression", pp. 66-75 (Mar. 13, 2017).

Kim, W.S., et al.,"Depth map coding with distortion estimation of rendered view", Proceedings of SPIE, vol. 7543, Visual Information Processing and Communication, 75430B, pp. 1-11 (Jan. 17, 2010); doi: 10.1117/12.839030.

Kingma, D. P., and Ba, J. L., "Adam: A Method for Stochastic Optimization", published as a conference paper at CLR 2015, arXiv:1412.6980v9 [cs.LG], pp. 1-15 (Jan. 30, 2017).

Kokkinos, I., "Pushing the Boundaries of Boundary Detection using Deep Learning", Retrieved from the Internet: URL:http://arxiv.org/pdf/1511.07386v2.pdf, pp. 1-12 (2016).

Kovesi, P., "Good Colour Maps: How to Design Them" arXiv:1509.03700, pp. 1-42 (Sep. 12, 2015).

Kunze, L., et al., "Reading between the Lanes: Road Layout Reconstruction from Partially Segmented Scenes", 2018 21st International Conference on Intelligent Transportation Systems (ITSC), pp. 401-408 (Nov. 4-7, 2018).

Kutulakos, K. N., and Seitz, S. M., "A Theory of Shape by Space Carving" International Journal of Computer Vision, vol. 38, No. 3, pp. 199-218 (2000).

Kuznietsov, Y., et al., "Semi-Supervised Deep Learning for Monocular Depth Map Prediction", Computer Vision and Pattern Recognition, pp. 6647-6655 (2017).

Laurentini, A., "How far 3D shapes can be understood from 2D silhouettes", IEEE Transactions on Pattern Analysis and Machine Intelligence, vol. 17, No. 2, pp. 188-195 (Feb. 1995).

Levi, D., et al., "Stixelnet: A Deep Convolutional Network for Obstacle Detection and Road Segmentation", 26th British Machine Vision Conference (BMVC), pp. 1-12 (2015).

Levin, C. A., and Haber, R. N., "Visual angle as a determinant of perceived interobject distance" Perception & Psychophysics volume, vol. 54, No. 2, pp. 250-259 (Mar. 1993).

Liang, Z., et al., "Learning for Disparity Estimation through Feature Constancy", Computer Vision and Pattern Recognition, pp. 2811-2820 (2018).

Liu, F., et al., "Learning Depth from Single Monocular Images Using Deep Convolutional Neural Fields", IEEE Transactions on Pattern Analysis and Machine Intelligence, pp. 1-16 (2015).

Liu, H. et al., "Neural Person Search Machines", IEEE International Conference on Computer Vision (ICCV), pp. 493-501 (2017).

Long, J., et al.,"Fully Convolutional Networks for Semantic Segmentation", IEEE Computer Vision Foundation, CVPR, pp. 3431-3440 (Nov. 2015).

Mayer, N., et al., "A Large Dataset to Train Convolutional Networks for Disparity, Optical Flow, and Scene Flow Estimation", IEEE Conference on Computer Vision and Pattern Recognition, pp. 1-14 (2016).

Mendes, C.C.T., et al.,"Exploiting Fully Convolutional Neural Networks for Fast Road Detection", Proceedings of IEEE, International Conference on Robotics and Automation (ICRA), pp. 1-6 (May 2016).

Mikić, I. et al., "Human Body Model Acquisition and Tracking Using Voxel Data", International Journal of Computer Vision, vol. 53, No. 3, pp. 199-223 (2003).

Mohan, R., "Deep Deconvolutional Networks for Scene Parsing", arXiv:1411.4101v1 [stat.ML], pp. 1-8 (Nov. 15, 2014).

Molchanov, P., "Pruning Convolutional Neural Networks for Resource Efficient Inference", Published as a conference paper at ICLR 2017, arXiv:1611.06440v2 [cs.LG], pp. 1-17 (Jun. 8, 2017).

Neven, D., et al.,"Towards End-to-End Lane Detection: an Instance Segmentation Approach", arXiv:1802.05591v1 [cs.CV], pp. 1-7 (Feb. 15, 2018) XP055590532, Retrieved from the Internet: URL:https://arxiv.org/pdf/1802.05591.pdf.

Oliveira, G. L., "Efficient Deep Models for Monocular Road Segmentation", IEEE/ RSJ International Conference on Intelligent Robots and Systems (IROS), pp. 1-7 (2016).

Park, J. J., et al., "DeepSDF: Learning Continuous Signed Distance Functions for Shape Representation", Proceedings of the IEEE/CVF Conference on Computer Vision and Pattern Recognition (CVPR), pp. 165-174 (2019).

Palmisano, S., et al., "Stereoscopic perception of real depths at large distances", Journal of Vision, vol. 10, No. 6, pp. 1-16 (Jun. 2010).

Pang, J., et al., "Cascade Residual Learning: A Two-Stage Convolutional Neural Network for Stereo Matching", IEEE International Conference on Computer Vision Workshops (ICCVW), pp. 887-895 (Oct. 22, 2017).

Rauch, S., et al., "Autonomes Fahren auf der Autobahn—Eine Potentialstudie für zukünftige Fahrerassistenzsysteme", XP055715893, Munchen, pp. 1-13, (Dec. 31, 2012), Retrieved from the Internet: https://mediatum.ub.turn.de/doc/1142101/1142101.pdf [retrieved on Jul. 17, 2020].

Rothe, R., et al., "Non-Maximum Suppression for Object Detection by Passing Messages Between Windows", In Asian Conference on Computer Vision, pp. 1-17 (2015).

Seki, A., and Pollefeys, M., "Patch Based Confidence Prediction for Dense Disparity Map", British Machine Vision Conference, pp. 1-13 (2016).

Seki, A., and Pollefeys, M., "SGM-Nets: Semi-Global Matching with Neural Networks", IEEE Conference on Computer Vision and Pattern Recognition, pp. 231-240 (2017).

Shaked, A., and Wolf, L., "Improved Stereo Matching With Constant Highway Networks and Reflective Confidence Learning", IEEE Conference on Computer Vision and Pattern Recognition, pp. 1-13 (2016).

Stein, G. P., et al.,"Vision-Based ACC With a Single Camera: Bounds on Range and Range Rate Accuracy", Proceedings of IEEE Intelligent Vehicle Symposium, pp. 1-6 (2003).

Suorsa, R. E., et al.,"A Parallel Implementation of a Multisensor Feature-Based Range-Estimation Method", IEEE Transactions on Robotics and Automation, vol. 10, Issue 6, pp. 1-34 (1994).

Szegedy, C.,et al.,"Going Deeper with Convolutions", arXiv:1409.4842v1 [cs.CV], Available at: https://arxiv.org/abs/1409.4842, pp. 1-12 (Sep. 17, 2014).

Tao, A., et al.,"Detectnet: Deep Neural Network for Object Detection in Digits", accessed at: https://devblogs.nvidia.com/detectnet-deep-neural-network-object-detection-digits/. Accessed on Jul. 22, 2019 , pp. 1-9.

Tateno, K. et al.,"CNN-SLAM: Real-time dense monocular SLAM with learned depth prediction", pp. 6243-6252 (2017).

Teichmann, M., et al., "Multinet: Real-Time Joint Semantic Reasoning for Autonomous Driving", arXiv:1612,.07695v2 [cs.CV], pp. 1-10 (May 8, 2018).

Thrun, S., et al., "Probabilistic Robotics: Intelligent Robotics and Autonomous Agents," The MIT Dress, pp. 1-180 (2005).

Virgo, M., "Lane Detection with Deep Learning (Part 1)", Accessed on Feb. 22, 2019 at: https://towardsdatascience.com/lane-detection-with-deep-learning-part-1-9e096f3320b7, pp. 1-10 (May 9, 2017).

Wang, Z., "Image quality assessment: from error visibility to structural similarity", IEEE Transactions on Image Processing, vol. 13, No. 4, pp. 1-14, (Apr. 2004).

Weber, M., et al., "Deeptlr: A Single Deep Convolutional Network for Detection and Classification of Traffic Lights", In IEEE Intelligent Vehicles Symposium (IV), pp. 1-7 (Jun. 2016).

Wu, J., et al., "Automatic background filtering and lane identification with roadside LiDAR data", 2017 IEEE 20th International Conference on Intelligent Transportation Systems (ITSC), pp. 1-6 (2017).

Xie, S., and Tu, Z., "Holistically-Nested Edge Detection", Computer Vision Foundation, pp. 1395-1403 (2015).

(56) References Cited

OTHER PUBLICATIONS

International Search Report and Written Opinion in International Patent Application No. PCT/US2020/021894 dated Aug. 3, 2020.

\* cited by examiner

INTERSECTION DETECTION AND CLASSIFICATION IN AUTONOMOUS MACHINE APPLICATIONS

CROSS-REFERENCE TO RELATED APPLICATIONS

This application claims the benefit of U.S. Provisional Application No. 62/816,838, filed on Mar. 11, 2019, which is hereby incorporated by reference in its entirety.

BACKGROUND

Autonomous driving systems and advanced driver assistance systems (ADAS) typically leverage various sensors to perform various tasks—such as lane keeping, lane changing, lane assignment, camera calibration, turning, stopping, path planning, and localization. For autonomous and ADAS systems to operate independently and efficiently, an understanding of the surrounding environment of the vehicle in real-time or near real-time is necessary. This understanding may include information as to locations of objects, obstacles, lanes and/or intersections in the environment with respect to various demarcations, such as lanes, road boundaries, intersections, and/or the like. The information of the surrounding environment may be used by a vehicle when making decisions, such as when, where and for how long to stop.

As an example, information regarding locations and attributes of intersections in an environment of an autonomous or semi-autonomous vehicle may prove valuable when making path planning, obstacle avoidance, and/or control decisions—such as where to stop, when to stop, when to move, what path to use to safely traverse an intersection, where other vehicles or pedestrians may be located, and/or the like. This is particularly important when the vehicle is operating in urban and/or semi-urban driving environments, where intersection understanding and path planning becomes crucial—e.g., due to the increased number of variables relative to a highway driving environment. For example, where a vehicle has to slow down to a full stop and wait at an intersection in a bi-directional, multi-lane driving environment, determining a location and type (e.g., multiway stop, yield, traffic light, etc.) of the intersection becomes critical to safe and effective autonomous and/or semi-autonomous driving.

In conventional systems, intersections may be interpreted by individually detecting and combining several characteristics of a vehicle and its surrounding environment. For example, to detect an intersection, multiple objects (e.g., traffic light, stop sign), vehicle positions, vehicle orientation, lanes, etc. may be separately detected and pieced together to detect and classify a single intersection. However, such solutions require an accurate and detailed algorithm to recognize relevant features for intersection detection and combine a variety of features for each possible type of intersection. As a result, the more complex the intersections, the more detailed the annotations that are required—thereby increasing the complexity of accurately detecting and classifying intersections as well as decreasing the scalability of intersection detection. In addition, because separate detection processes must be executed, and then later combined together to generate a final classification of an intersection, the compute resources required make real-time or near real-time intersection detection and classification more challenging. Further, a detection error related to a single feature may result in failure to detect an intersection properly (e.g., misclassification), thereby leading to a system that may be less reliable than desired.

Other conventional systems may interpolate intersections by comparing the individually detected features to features in pre-stored high-definition (HD), three-dimensional (3D) maps of a driving surface of the vehicle. However, such map-based solutions are highly reliant on accuracy and availability of the maps. As such, these conventional systems fail when a map is outdated or unavailable for a certain area. For example, the process can be logistically more complex when manual-labelling larger geographic regions (e.g., cities, states, countries) is required in order for the vehicle to be able to independently and effectively drive in varying regions. The conventional systems also fail when a transient intersection condition (e.g., police directing traffic, stopped school bus) exists that may not be reflected in the maps.

SUMMARY

Embodiments of the present disclosure relate to intersection detection and classification—e.g., for associated wait conditions—in autonomous machine applications. Systems and methods are disclosed that leverage outputs from various sensors of a vehicle to detect regions of an environment that correspond to intersections and to classify—holistically, looking at an intersection region of the environment as a whole—intersections in real-time or near real-time.

In contrast to conventional systems, such as those described above, the current system may use live perception of the vehicle to detect and classify one or more intersections in a vehicle's environment. Locations of intersections, distances to intersections, and/or attributes (e.g., classifications of wait conditions) corresponding to the intersections may be leveraged to detect and classify intersections. For example, machine learning algorithm(s)—such as deep neural networks (DNNs)—may be trained to compute information corresponding to an intersection—such as intersection bounding boxes, coverage maps, attributes, distances, etc.—and this information may be used to effectively and accurately determine intersection locations and attributes, as well as distances to intersections. The outputs may be used by the vehicle to effectively and accurately navigate the intersection(s). For example, the outputs of the DNN may be used to directly or indirectly (e.g., via decoding) determine: a location of each intersection, a distance to each intersection, a wait condition associated with each intersection, where to stop at each intersection, how long to stop at each intersection, and/or the like.

As a result of using live perception to generate an understanding of each intersection, the process of detecting and classifying intersections may be comparatively less time-consuming, less computationally intense, and more scalable as the system may learn to diagnose each intersection in real-time or near real-time, without requiring prior experience or knowledge of the intersection, and without requiring individually detecting and combining several features of a vehicle and its environment. As a result, the autonomous vehicle may be capable of traveling more freely through cities, urban environments, or other locations where HD maps may not be readily available or completely accurate.

BRIEF DESCRIPTION OF THE DRAWINGS

The present systems and methods for intersection detection and classification in autonomous machine applications is described in detail below with reference to the attached drawing figures, wherein.

DETAILED DESCRIPTION

Figure 1:
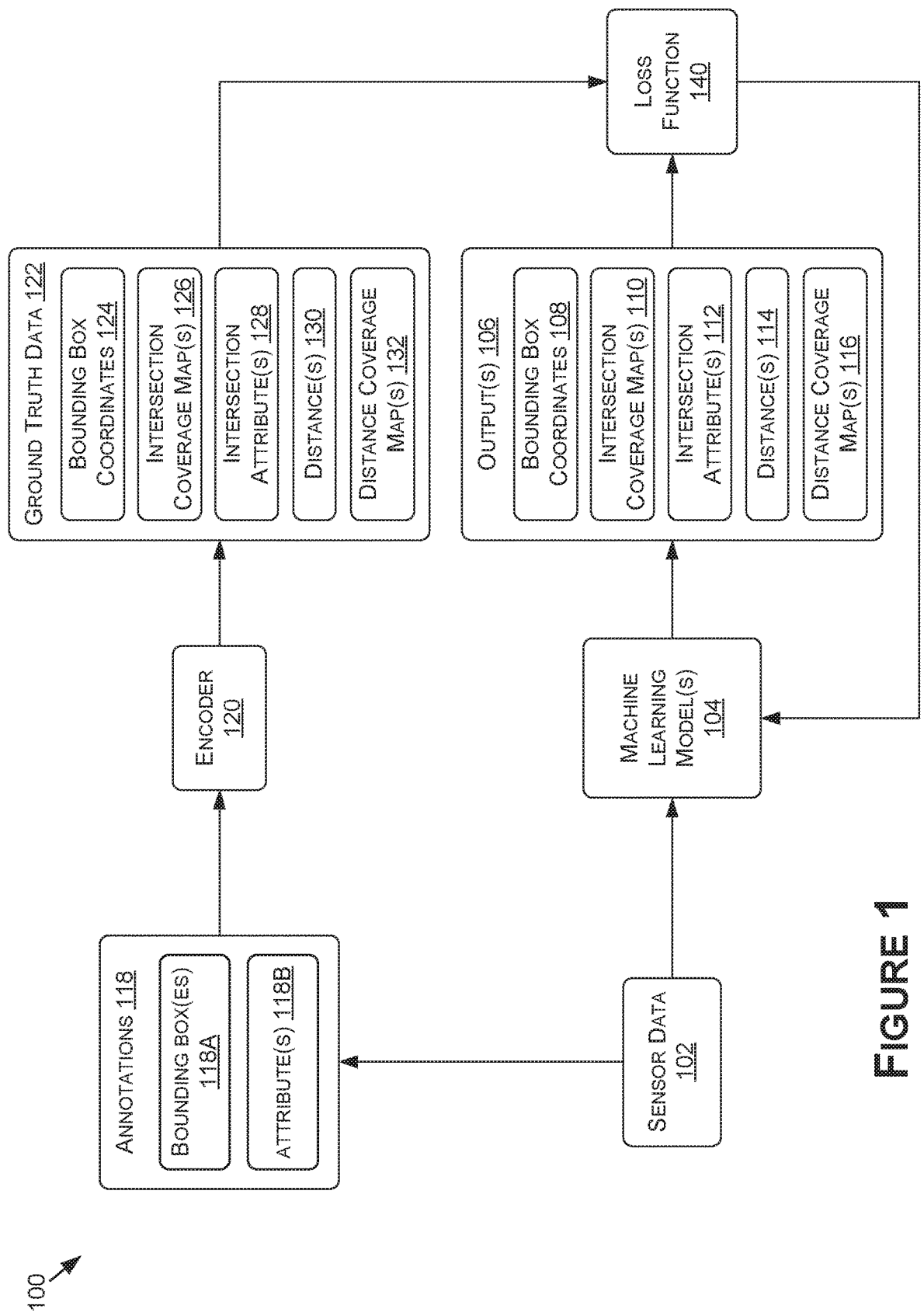
FIG. 1 is an example data flow diagram illustrating an example process for training a neural network to detect and classify intersections using outputs from one or more sensors of a vehicle, in accordance with some embodiments of the present disclosure.

Systems and methods are disclosed related to intersection detection and classification in autonomous machine applications. Although the present disclosure may be described with respect to an example autonomous vehicle 700 (alternatively referred to herein as "vehicle 700" or "ego-vehicle 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems (ADAS)), robots, warehouse vehicles, off-road vehicles, flying vessels, boats, shuttles, emergency response vehicles, motorcycles, electric or motorized bicycles, aircraft, construction vehicles, underwater craft, drones, and/or other vehicle types. In addition, although the present disclosure may be described with intersection detection and classification for vehicle applications, this is not intended to be limiting, and the systems and methods described herein may be used in augmented reality, virtual reality, simulation systems (e.g., for testing a virtual vehicle or robot—or systems corresponding thereto—in a virtual world), robotics, security and surveillance, autonomous or semi-autonomous machine applications, and/or any other technology spaces where detection of intersection or other environment structures and/or poses may be used.

As described herein, in contrast to conventional approaches, the current systems and methods provide techniques to detect and classify intersections using outputs from sensors (e.g., cameras, RADAR sensors, LIDAR sensors, etc.) of a vehicle in real-time or near real-time. As such, for each intersection, live perception of the vehicle may be used to detect locations of intersections, distances to intersections, and/or attributes or classifications corresponding to the intersections. Computer vision and/or machine learning model(s) (e.g., deep neural networks (DNNs), such as convolutional neural networks (CNNs)) may be trained to compute outputs that—after decoding, in embodiments—result in detected intersections, distances thereto, and/or classifications or attributes thereof, and the outputs may be used by the vehicle to effectively and accurately navigate the intersection(s).

In some embodiments, in order to accurately classify two or more intersections that may visually overlap in image-space, the machine learning model(s) may be trained to compute, for pixels within the bounding shape, pixel distances corresponding to edges of a corresponding bounding shape such that the bounding shape can be generated. By doing this, each pixel may individually represent the shape and location of the bounding shape, so a smaller encoding space (e.g., smaller than the actual number of pixels that correspond to the bounding shape) may be used to encode the bounding shape edge locations—thus removing the overlap between successive bounding shapes in an image. In addition, in some embodiments, temporal processing may be used to enhance the stability and the accuracy of the predictions over time, such that prior detections and classifications may be leveraged to inform current predictions. To train the machine learning models to predict distances to intersections, ground truth information may be generated and associated—automatically, in embodiments—with the ground truth sensor data. For example, as a vehicle traverses a portion of an environment captured in an image, the motion of the vehicle as captured from vehicle sensors may be used to determine a distance travelled to each intersection, and the distance travelled may be attributed to the distance to the intersection.

As such, by using live perception to generate an understanding of each intersection, the process of detecting and classifying intersections may be comparatively less time-consuming, less computationally intense, and more scalable as the system may learns to diagnose each intersection in real-time or near real-time. In addition, and in further contrast to conventional systems, prior knowledge or experience of an intersection is not required.

In deployment, sensor data (e.g., image data, LIDAR data, RADAR data, etc.) may be received and/or generated using sensors (e.g., cameras, RADAR sensors, LIDAR sensors, etc.) located or otherwise disposed on an autonomous or semi-autonomous vehicle. The sensor data may be applied to a neural network (e.g., a deep neural network (DNN), such as a convolutional neural network (CNN)) that is trained to identify areas of interests pertaining to intersections (e.g., raised pavement markers, rumble strips, colored lane dividers, sidewalks, cross-walks, turn-offs, etc.) represented by the sensor data, as well as semantic (e.g., wait conditions) and/or distance information pertaining thereto. More specifically, the neural network may be designed to compute data representative of intersection locations, classifications, and/or distances to intersections. For example, the computed outputs may be used to determine locations of a bounding shape(s) corresponding to an intersection(s), confidence maps for whether or not pixels correspond to an intersection, distances to the intersection(s), classification and semantic information (e.g., attributes, wait conditions), and/or other information. In some examples, the computed location information (e.g., pixel distance to left edge, right edge, top edge, bottom edge of corresponding bounding box) for an intersection may be represented as a pixel-based coverage map with each pixel corresponding to an intersection as uniformly weighted. In addition, the distance (e.g., distance of the vehicle to the bottom edge of the intersection bounding box) may be represented as a pixel-based distance coverage map.

The DNN may be trained to predict any number of different information—e.g., via any number of channels—that correspond to the intersection(s) location, distance, and attributes. For example, the channels may represent intersection locations, intersection coverage maps, intersection attributes, intersection distances, intersection distance coverage maps, and/or other channels. During training, the DNN may be trained with images or other sensor data representations labeled or annotated with bounding boxes representing intersections, and may further include semantic information corresponding thereto. The labeled bounding boxes and the semantic information may then be used by a ground truth encoder to generate intersection locations, coverage maps, confidence values, attributes, distances, distance coverage maps, and/or other information corresponding to the intersection as determined from the annotations.

Locations of intersection bounding shapes may be encoded to generate one or more intersection coverage maps. In some embodiments, the DNN may be trained to react equally to all pixels in each bounding box and, as a result, a uniform mask may be applied to each pixel in a bounding shape. The intersection coverage map may encode confidence values corresponding to whether each pixel is associated with an intersection or not. The pixels that correspond to a bounding shape may be used to determine corresponding location information for locations of bounding shapes encoded to the same pixels. For example, for a given pixel that is determined to correspond to a bounding shape, the bounding box location information corresponding to that pixel may be used, at least in part, to determine a location and dimensionality of the bounding shape for the particular sensor data instance (e.g., image). As described herein, because two or more intersections may overlap spatially within image-space, the number of pixels within the coverage map for a given intersection or bounding shape may be reduced (e.g., shrunken to crop off a top-portion), such that the overlap region (e.g., where a top of a bounding shape may overlap with a bottom of another bounding shape) may be removed from consideration for determining the bounding shape locations and dimensionality. As such, the DNN may be trained to detect intersections closer and farther away from the vehicle without the bounding shape corresponding a closer intersection interfering with predictions for the bounding shape for another intersection further away from the vehicle.

In some examples, and as a result of different sensor data instances including different numbers of intersection, the ground truth data may be encoded using a number of different coverage maps. For examples, coverage maps for close, mid, and/or far ranges (e.g., distances) within each image may be encoded separately such that the DNN may be trained with individual channels for each range. The distances for each intersection in an image may then be used to determine which intersection is located in which range.

Once the DNN is trained, the DNN may regress on outputs representative of intersection bounding box coordinates, coverage maps, confidence values, attributes, distances, distance coverage maps, and/or other outputs corresponding to the encoded ground truth channels the network is trained to predict, as described herein. Using the outputs of the DNN—after decoding, in embodiments—the pixels corresponding to a bounding shape may be detected, and the region of the world-space environment corresponding to the region within the bounding shape in image-space may be classified as having a particular wait condition(s) and/or other attributes (e.g., further based on the outputs of the DNN). For example, once a confidence is determined for each pixel as to whether the pixel corresponds to a bounding shape, the associated bounding shape locations for the pixel may be leveraged to determine a bounding shape location prediction. The combination of the bounding shape location predictions from a plurality of pixels may then be used to generate a final prediction of a location of the bounding shape. In some embodiments, a random sample consensus (RANSAC) algorithm may be used to determine the final prediction from the individual predictions corresponding to respective pixels.

Further, to determine the classifications or attributes for a given intersection, a number of pixels with a same attribute may be used to determine final attributes for the final bounding shape associated with an intersection. For example, where a threshold number of pixels within a bounding shape are all associated with the same attribute, the attribute may be determined to be associated with the intersection. This process may be repeated for each attribute type and, as a result, the detected intersection may be associated with a set of (e.g., one or more) final attributes based on at least a certain number of pixels within its corresponding final bounding shape predicted to include those attributes.

In some examples, temporal analysis may be performed on the bounding boxes, distances, and/or the attributes to confirm stability, robustness and accuracy of the DNN predictions. The current prediction of the DNN may be weighted against prior prediction(s) of the DNN corresponding to prior instance(s) of the sensor data. In some examples, temporal filtering (e.g., statistical filtering) may be performed over multiple predictions corresponding to previous consecutive frames of sensor data. Motion of the vehicle between consecutive sensor data instances may be leveraged to accurately perform the temporal filtering.

In some examples, during deployment, the motion of the vehicle may be tracked and associated with the sensor data to generate new ground truth data for further training the DNN and/or another DNN. As such, and similar to the initial training process of the DNN, the distance traveled by the vehicle from a world-space location of a captured instance of sensor data (e.g., an image) to a world-space location of the intersection (e.g., the entry to the intersection) may be tracked, and this distance may be encoded as the distance to the intersection for training the DNN. As such, the entry point location to the intersection may then be back-projected into previous instances of sensor data to train the DNN to calculate distances to intersections. The distances may be encoded to generate a coverage map corresponding to distances, and/or may be used to encode a distance value to pixels of the image (e.g., every pixel, pixels corresponding to the intersection, pixels outside of intersections, etc.). In this way, motion of the vehicle may be leveraged to generate ground truth data to train the DNN.

With reference to FIG. 1, FIG. 1 is an example data flow diagram illustrating an example process 100 for training a neural network to detect and classify intersection(s) using outputs from one or more sensors of a vehicle, in accordance with some embodiments of the present disclosure. It should be understood that this and other arrangements described herein are set forth only as examples. At a high level, the process 100 may include one or more machine learning model(s) 104 receiving one or more inputs, such as sensor data 102, and generating one or more outputs, such as one or more output(s) 106. In some examples, when used for training, the sensor data 102 may be referred to as training data. Although the sensor data 102 is primarily discussed with respect to image data representative of images, this is not intended to be limiting, and the sensor data 102 may include other types of sensor data used for intersection pose detection, such as LIDAR data, SONAR data, RADAR data, and/or the like—e.g., as generated by one or more sensors of the vehicle 700 (FIGS. 7A-7D).

The process 100 may include generating and/or receiving sensor data 102 from one or more sensors. The sensor data 102 may be received, as a non-limiting example, from one or more sensors of a vehicle (e.g., vehicle 700 of FIGS. 7A-7C and described herein). The sensor data 102 may be used by the vehicle, and within the process 100, to detect and generate paths to navigate intersections in real-time or near real-time. The sensor data 102 may include, without limitation, sensor data 102 from any of the sensors of the vehicle including, for example and with reference to FIGS. 7A-7C, global navigation satellite systems (GNSS) sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 776, stereo camera(s) 768, wide-view camera(s) 770 (e.g., fisheye cameras), infrared camera(s) 772, surround camera(s) 774 (e.g., 360 degree cameras), long-range and/or mid-range camera(s) 778, speed sensor(s) 744 (e.g., for measuring the speed of the vehicle 700), and/or other sensor types. As another example, the sensor data 102 may include virtual sensor data generated from any number of sensors of a virtual vehicle or other virtual object. In such an example, the virtual sensors may correspond to a virtual vehicle or other virtual object in a simulated environment (e.g., used for testing, training, and/or validating neural network performance), and the virtual sensor data may represent sensor data captured by the virtual sensors within the simulated or virtual environment. As such, by using the virtual sensor data, the machine learning model(s) 104 described herein may be tested, trained, and/or validated using simulated data in a simulated environment, which may allow for testing more extreme scenarios outside of a real-world environment where such tests may be unavailable or less safe.

In some embodiments, the sensor data 102 may include image data representing an image(s), image data representing a video (e.g., frames of video), and/or sensor data representing sensory fields of sensors or derivatives of sensor data (e.g., depth maps for LIDAR sensors, a value graph for ultrasonic sensors, etc.). Where the sensor data 102 includes image data, any type of image data format may be used, such as, for example and without limitation, compressed images such as in Joint Photographic Experts Group (JPEG) or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC), or other type of imaging sensor, and/or other formats. In addition, in some examples, the sensor data 102 may be used within the process 100 without any pre-processing (e.g., in a raw or captured format), while in other examples, the sensor data 102 may undergo pre-processing (e.g., noise balancing, demosaicing, scaling, cropping, augmentation, white balancing, tone curve adjustment, etc., such as using a sensor data pre-processor (not shown)). As used herein, the sensor data 102 may reference unprocessed sensor data, pre-processed sensor data, or a combination thereof.

The sensor data 102 used for training may include original images (e.g., as captured by one or more image sensors), down-sampled images, up-sampled images, cropped or region of interest (ROI) images, otherwise augmented images, and/or a combination thereof. The machine learning model(s) 104 may be trained using the images (and/or other sensor data 102) as well as corresponding ground truth data 122. The ground truth data 122 may include annotations, labels, masks, maps, and/or the like. For example, in some embodiments, the ground truth data 122 may include bounding box coordinates 124, an intersection coverage map 126, an intersection attribute(s) 128, a distance 130, and/or a distance coverage map 123. An encoder 120 may use the annotations 118 to encode the ground truth data 122. In some embodiments, the annotations 118 may include bounding box(es) 118A and attributes(s) 118B of the bounding box(es) 118A.

With reference to the annotations 118, the annotations 118 may be generated within a drawing program (e.g., an annotation program), a computer aided design (CAD) program, a labeling program, another type of program suitable for generating the annotations 118 and/or other of the ground truth data 122, and/or may be hand drawn, in some examples. In any example, the annotations 118 and/or the ground truth data 122 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., where a human identifies center or origin point and dimensions of lane, and a machine generates lanes).

The bounding box(es) 118A may include annotations, or other label types, corresponding to features or areas of interest corresponding to the intersection. In some examples, the intersection may be defined as a bounding box corresponding to the location of the intersection as represented by the sensor data 102. An intersection may be annotated at any location where two or more roads (e.g., streets) intersect, where a same road has a pedestrian crossing or private entry (e.g., driveway, parking lot, etc.), where emergency vehicles may enter the roadway, and/or any other intersection type. The bounding box(es) 118A may be generated as any shape (e.g., a rectangle, a box, a square, a circle, a polygon, a triangle, two-dimensional (2D), three-dimensional (3D), etc.) covering the area and/or location where the intersection(s) is located. In sensor data 102 instances where more than one intersection is present, multiple bounding box(es) 118A may be annotated, with one bounding box per intersection—which may or may not overlap depending on the field of view and/or perspective. In some examples, the bounding box(es) 118A may be annotated to include all visual features of the intersection (e.g., traffic lights, stop line, stop sign, crosswalks, traffic signs, etc.). In addition, the bounding box(es) 118A may be annotated such that a bottom edge of the bounding box(es) 118A extends along a first feature of the intersection—which may be an intersection or crosswalk entry line, in examples. In any example, the bounding box(es) 118A may be annotated to fit as tightly to the intersection as possible while still including all visual features that may aid in the interpretation of the intersection structure, pose, attributes—e.g., wait conditions—and/or other information.

The attribute(s) 118B may be generated for each of the bounding box(es) 118A for each of the images (or other data representations) represented by the sensor data 102 used for training the machine learning model(s) 104. The attribute(s) 118B may represent semantic information (e.g., individual labels or classifications for features of the environment, overall labels for wait conditions that apply to the entire intersection, individual wait conditions that apply to individual features of the environment, etc.) regarding the corresponding intersection within the bounding box(es) 118A. The number of attribute(s) 118B may correspond to the number and/or types of features (e.g., classifications, wait conditions, intersections) that the machine learning model(s) 105 is trained to predict, or to the number of wait conditions and/or types of intersections in the respective instance of the sensor data 102. Depending on the embodiment, the attribute(s) 118B may correspond to classifications or tags corresponding to the feature type of an intersection, such as but not limited to, yield controlled, stop controlled, uncontrolled, connecting smaller roads, inside, traffic light controlled, roundabout, pedestrian, special, not in path, construction, and/or other feature types.

In some examples, the intersection location and/or a distance to the intersection may be determined based on the annotations 118. In such examples, two or more edges, vertices, and/or other features of the bounding box(es) 118A may be used to determine the pixel location of the bounding box(es) 118A. For example, the pixel coordinates of the top left corner and the bottom right corner may be encoded as the location (e.g., location coordinates within the sensor data instance) of the bounding box(es) 118A. In other examples, the location of the bounding box(es) 118A may be encoded as a pixel distance to a left edge, a right edge, a top edge, and/or a bottom edge of the bounding box(es) 118A. The distance to the intersection(s) for the bounding box(es) 118A, where the bounding box(es) 118A is used to determine distance, may be encoded as a distance to a bottom edge of the bounding box(es) 118A, a top edge, a side edge, a vertice(s), and/or another feature of the intersection.

Figure 2A:
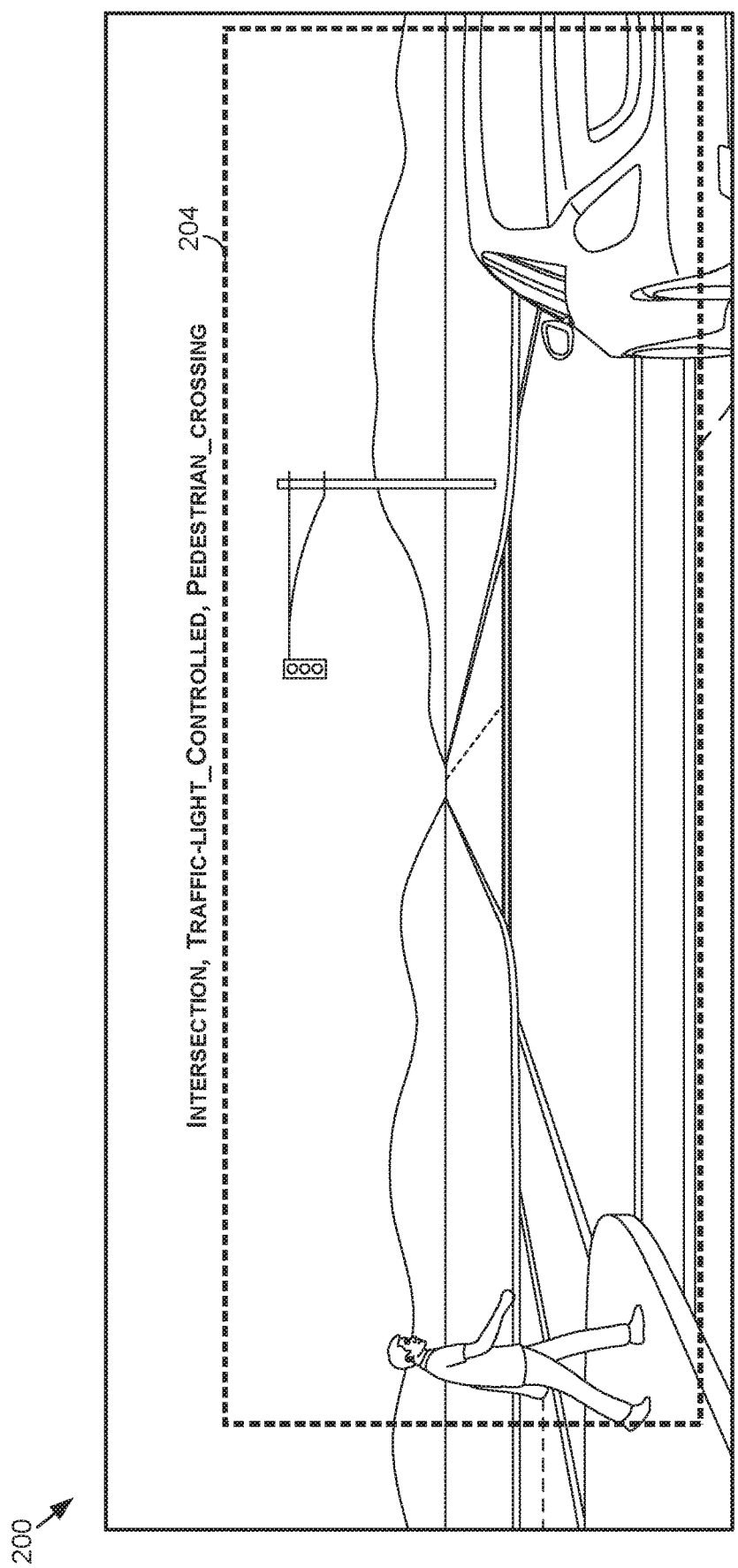
FIGS. 2A-2B are illustrations of example annotations to be applied to sensor data for use in ground truth generation for training a machine learning model to detect and classify intersections, in accordance with some embodiments of the present disclosure.
Figure 2B:
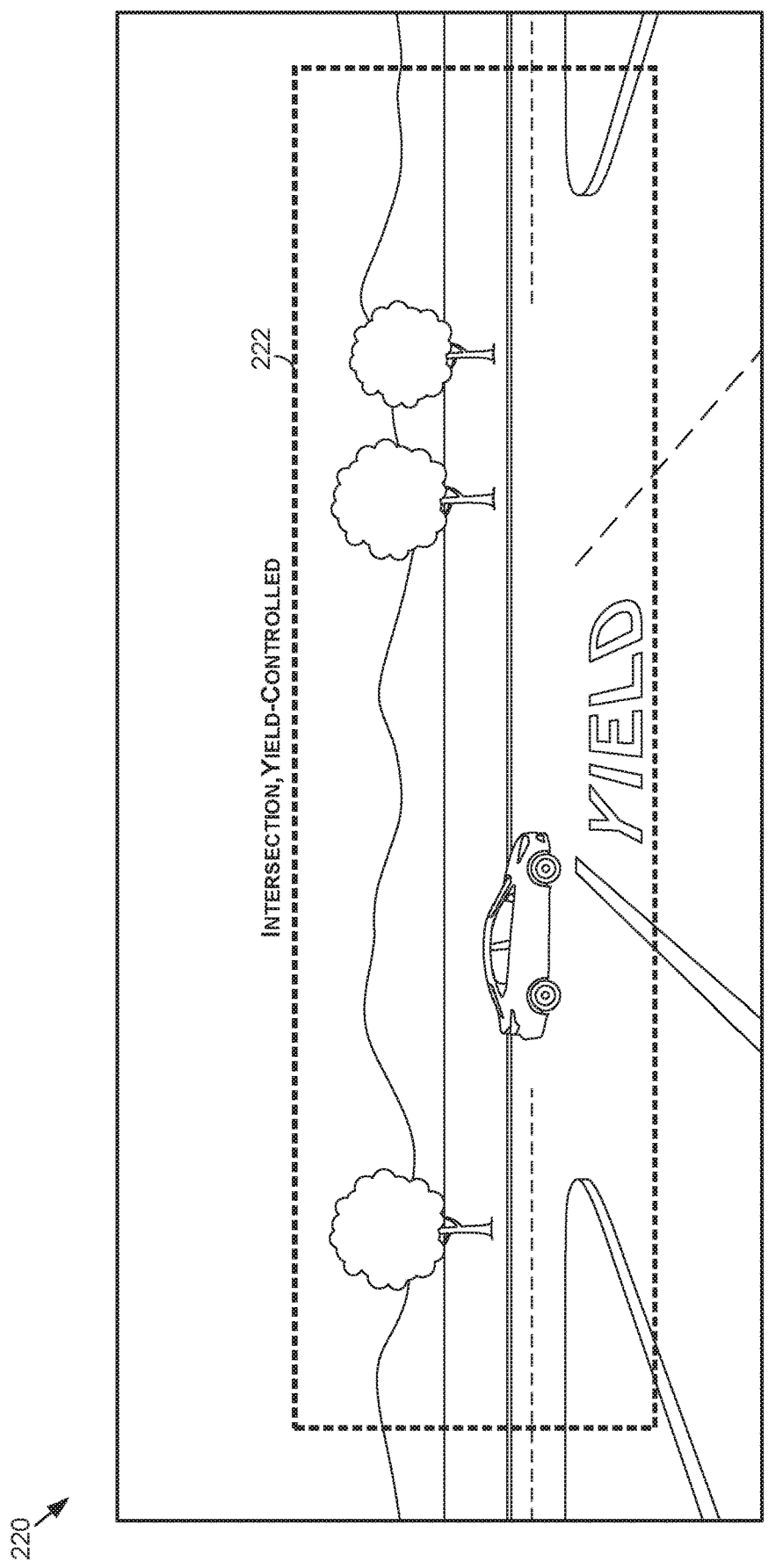

As examples of the annotations 118, and with reference to FIGS. 2A-2B, FIGS. 2A-2B illustrate annotations applied to sensor data for use in ground truth generation for training a machine learning model to detect and classify intersections, in accordance with some embodiments of the present disclosure. For example, FIG. 2A illustrates an example labeling (e.g., corresponding to the annotations 118) of an image 200 that may be used to generate ground truth data in accordance with the training process 100 of FIG. 1. An intersection in an image may be annotated with a bounding box 118A (e.g., bounding box 204) and corresponding classifications (e.g., traffic-light_controlled, pedestrian_crossing). For example, the intersection corresponding to the bounding box 204 may be labeled using a bounding box and classified as one or more of traffic-light_controlled, intersection, and pedestrian_crossing. The different classification labels may be represented in FIG. 2A by different bounding box line types—e.g., solid lines, dashed lines, etc.—to represent different classifications. However, this is not intended to be limiting, and any visualization of the intersection bounding box labels and their classifications may include different shapes, patterns, fills, colors, symbols, and/or other identifiers to illustrate differences in classification labels for features (e.g., wait conditions, attributes) in the images.

Referring now to FIG. 2B, FIG. 2B illustrates another example of annotations applied to sensor data to train a machine learning model to detect and classify intersections, in accordance with some embodiments of the present invention. Here, an intersection may be annotated with bounding box 222. The bounding box 222 may cover all features (e.g., YIELD sign painted on road surface) of the corresponding intersection. As a result of the annotations 118 associated with visualization 220, the bounding box 222 may be classified as a yield-controlled intersection (e.g., Yield_Controlled) based on the YIELD sign on the lane that is currently occupied by the vehicle. It should be noted that multiple intersections may be annotated with corresponding multiple bounding boxes and their classification when images in the sensor data include multiple intersections. Similarly, it should also be noted that attribute(s) 118 may be compound nouns. The different classification labels may be represented in FIG. 2B by solid lines, dashed lines, etc., to represent different classifications (e.g., attributes). Further, the different classification labels may be nouns and/or compound nouns. This is not intended to be limiting, and any naming convention for classifications (e.g., attributes) may be used to illustrate differences in classification labels for features (e.g., wait conditions, attributes) in the images.

Figure 5:
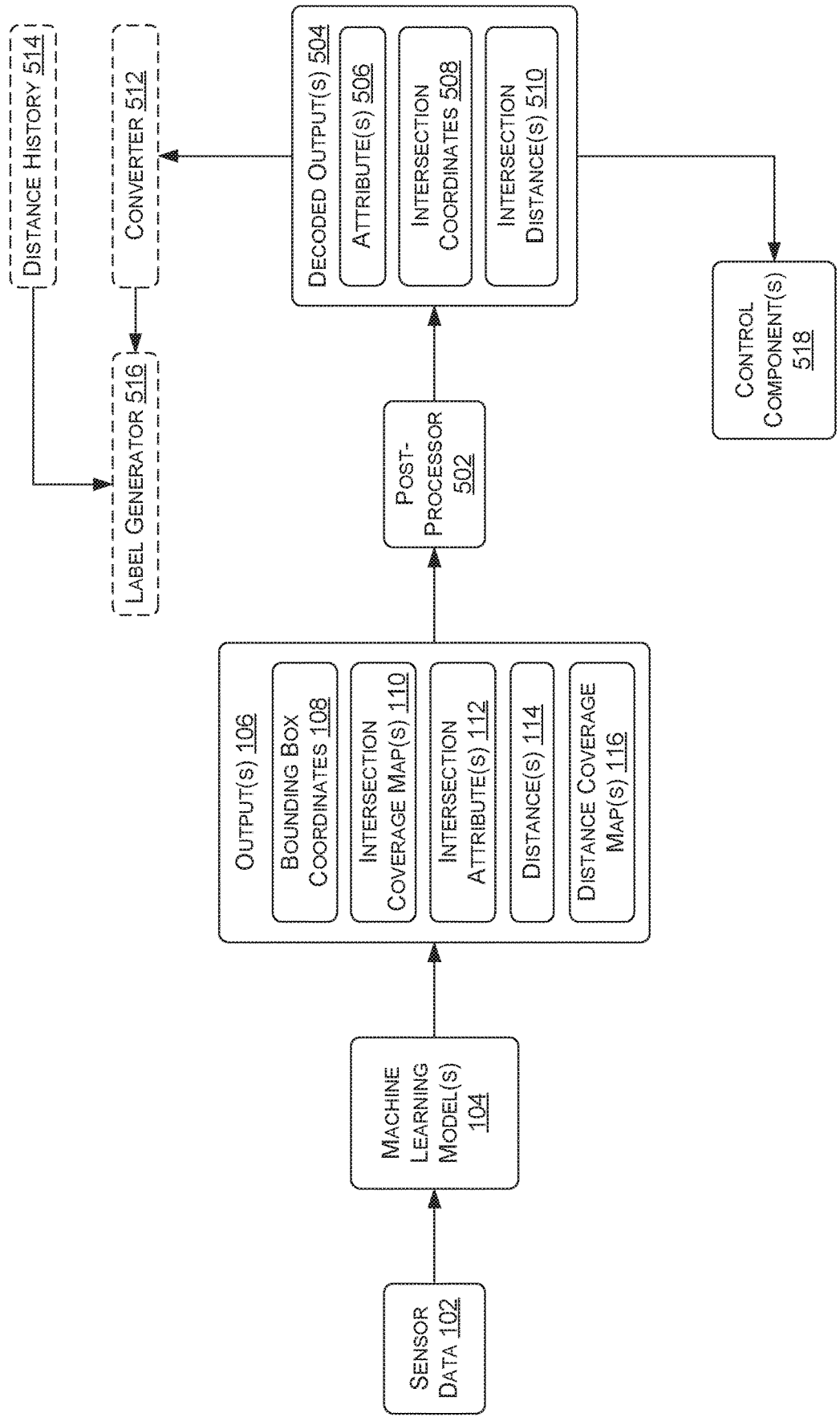
FIG. 5 is a data flow diagram illustrating an example process for detecting and classifying intersections using a machine learning model and based on outputs from sensors of a vehicle, in accordance with some embodiments of the present disclosure.

Referring again to FIG. 1, the encoder 120 may be configured to encode the ground truth information corresponding to the intersection using the annotation(s) 118 and/or distance history 514 (described in more detail with respect to at least FIG. 5). For example, as described herein, even though the annotations may be limited to bounding box(es) 118A and attribute(s) 118B, information such as intersection location, distance to intersection, and/or other intersection information may be determined from the annotations 118. Once this information is determined, the information may be encoded by the encoder 120 to generate the ground truth data 122. For example, pixels or points (e.g., each pixel, each pixel corresponding to a reduced-size coverage map, such as the bottom 100 pixels) within the bounding box(es) 118 may have pixel locations (e.g., of vertices, edges, etc.) corresponding to the bounding box(es) 118A location in image-space encoded thereto. In some embodiments, each pixel that has bounding box location information encoded thereto may be associated with a bounding box proposal—e.g., such that information corresponding to the single pixel may be used to generate a location proposal of a bounding box without requiring input from any other pixel. As a result, the machine learning model 104 may be trained to compute bounding box proposals for a plurality of pixels, and the individual proposals may be filtered, averaged, weighted, etc. to determine a final proposal. In some embodiments, the information encoded to the pixels may include distances to edges of the bounding box—e.g., along a same row and/or along a same column as the respective pixel. As such, and for an example, where a pixel has an value of (10, 100, 150, 20) encoded thereto, this may indicate that a left edge is 10 pixels to the left along a row of the pixel, a right edge is 100 pixels to the right along the row, a top edge is 150 pixels upward along a column of the pixel, and a bottom edge is 20 pixels downward along the column. In any example, at least two edge locations may be encoded to the pixel (e.g., at least one vertical edge and one horizontal edge). By encoding the bounding box location information in this way, the machine learning model 104 may be able to predict smaller coverage maps (e.g., shrunken coverage maps, as described herein) to allow for predictions of multiple intersections for a single sensor data instance. In some embodiments, however, the bounding box location information may be encoded differently, such as by associating a confidence with pixels that the pixel is a centroid of the bounding shape, and then further encoding the dimensions of the bounding box (e.g., a height and width).

For example, locations of the intersection bounding box(es) 118A may be encoded in the form of intersection coverage map(s) 126—such that the machine learning model(s) 104 may be trained to react equally to all pixels in each bounding box(es) 118A. In this way, a uniform mask may be applied to each pixel in a bounding box(es) 118A. In some examples, the intersection coverage map(s) 126 may also encode confidence values corresponding to whether each pixel in a bounding box(es) 118A is associated with an intersection or not. The pixels that correspond to a bounding box(es) 118A may be used to determine corresponding location information for locations of the bounding box(es) 118A encoded to the same pixels. For example, for a given pixel that is determined to correspond to a bounding box of the bounding box(es) 118A, the bounding box location information corresponding to that pixel may be used, at least in part, to determine a location and dimensionality of the bounding box for the particular sensor data instance (e.g., image) of the sensor data 102. In this way, some or all pixels within a bounding box may be given an equal weight, enabling the machine learning model(s) 104 to detect multiple intersections in a single instance of the sensor data 102. In some examples, the intersection coverage map(s) 126 may include multiple coverage maps, with each coverage map corresponding to different intersections or bounding box(es) 118A determined from the annotations 118.

In some examples, an intersection coverage map(s) 126 may be reduced in size—such as to enable the machine learning model(s) 104 to learn to predict multiple intersections accurately. For example, when a distance of the bounding box(es) 118A to the vehicle is below a threshold distance and/or bounding boxes of two intersections overlap within the image-space of the sensor data 102, at least one of the intersection coverage map(s) 126 may be reduced in size. In such examples, the number of pixels or points within the coverage map for a given intersection and/or bounding box(es) 118A may be reduced (e.g., by cropping off a top-portion) in the intersection coverage map(s) 126 such that the overlap region (e.g., where a top of a bounding shape may overlap with a bottom of another bounding shape) may be removed from consideration for determining the bounding box coordinates 124 (e.g., locations) and/or dimensionality. In some examples, the intersection coverage map(s) 126 may be reduced such that the bottom edge of the intersection coverage map(s) 126 remains the same as the initial intersection coverage map(s) (and thus the bounding box corresponding thereto), and an updated upper edge of the intersection coverage map(s) 126 is determined by removing pixels from the top portion of the initial intersection coverage map(s) 126. As such, and because at least some of the pixels within the coverage map(s) 126 individually represent a bounding box location and/or dimensionality, by reducing the size of the intersection coverage map(s) 126 the machine learning model(s) 104 may be trained to predict the bounding box locations and/or dimensionality accurately for each intersection within a sensor data instance. For example, were the intersection coverage map(s) 126 not reduced, one or more pixels or points may have first location information corresponding to a first bounding box and second location information corresponding to a second bounding box, such that the reconstructed bounding box may not accurately correspond to a single intersection (e.g., an upper edge may correspond to a first intersection while a bottom edge may correspond to a different intersection). As a result of the reduced-size intersection coverage map(s) 126, one or more of the pixels within the reduced-size intersection coverage map(s) 126 may have bounding box location and/or dimensionality information encoded thereto. In another example, each pixel or point within the bounding box may have location and/or dimensionality information encoded thereto, but the reduced-size intersection coverage map(s) 126 may be used to determine which pixels or points to leverage (e.g., the pixels or points inside of the reduced-size intersection coverage map(s) 126) when generating the final bounding box proposals, and which pixels or points to ignore (e.g., the pixels or points outside of the reduced-size intersection coverage map 126). As a result, the machine learning model(s) 104 may be trained to detect intersections closer and farther away from the vehicle 700 without predictions corresponding to one intersection interfering with predictions corresponding to another.

In some other examples, and as a result of different sensor data 102 instances including different numbers of intersection, the ground truth data 112 may be encoded using a number of different intersection coverage map(s) 126. For examples, intersection coverage map(s) 126 for close, mid, and/or far ranges (e.g., distances) within each instance of the sensor data 102 may be encoded separately such that the machine learning model(s) 104 may be trained with individual channels for each range. The close, mid, and/or far ranges may be pre-defined based on a pixel-based geometric analysis in accordance with a bottom edge pixel location of the bounding box(es) 118A).

Figure 3A:
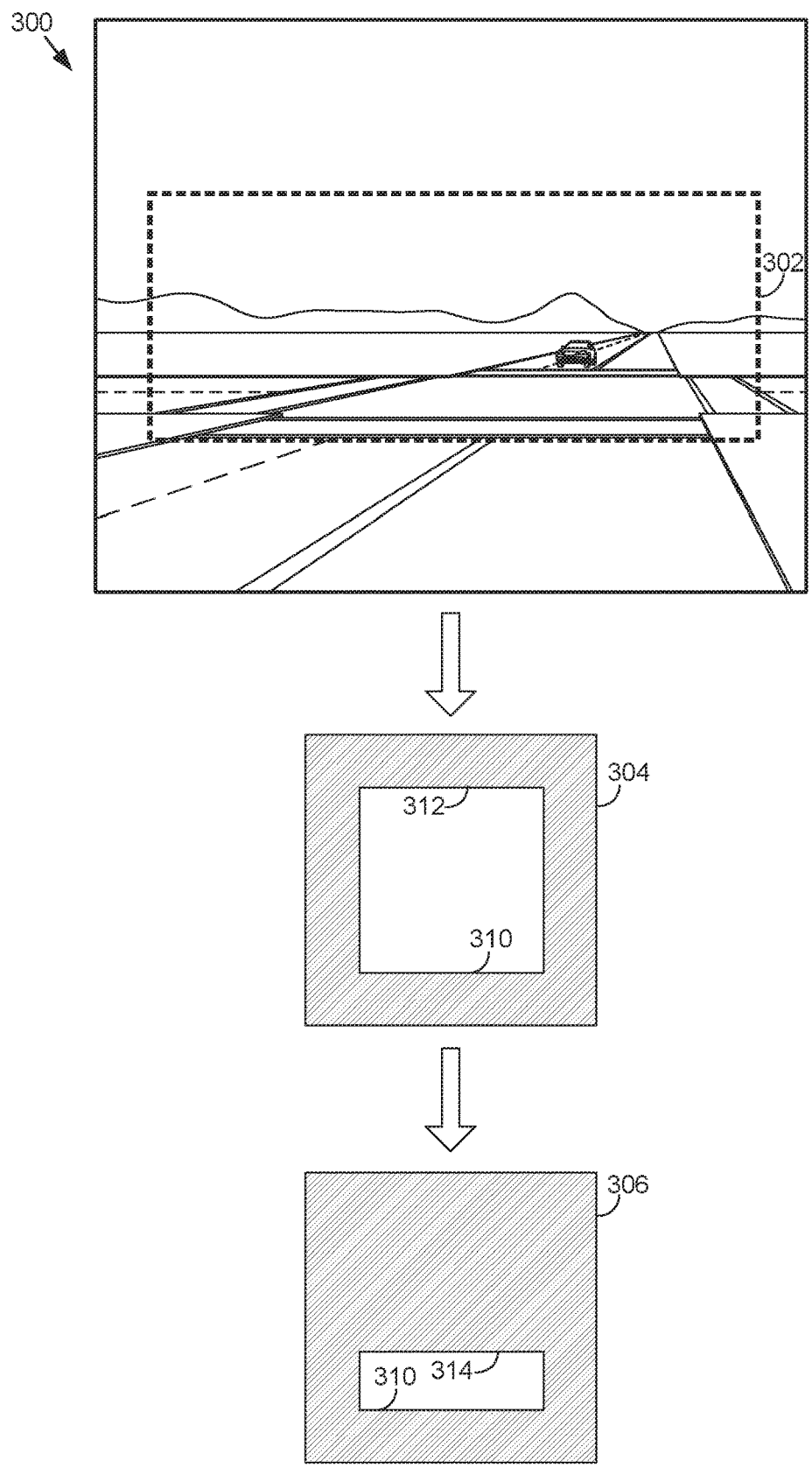
FIGS. 3A-3B are illustrations of example intersection coverage maps for use in ground truth generation for training a machine learning model to detect and classify intersections, in accordance with some embodiments of the present disclosure.
Figure 3B:
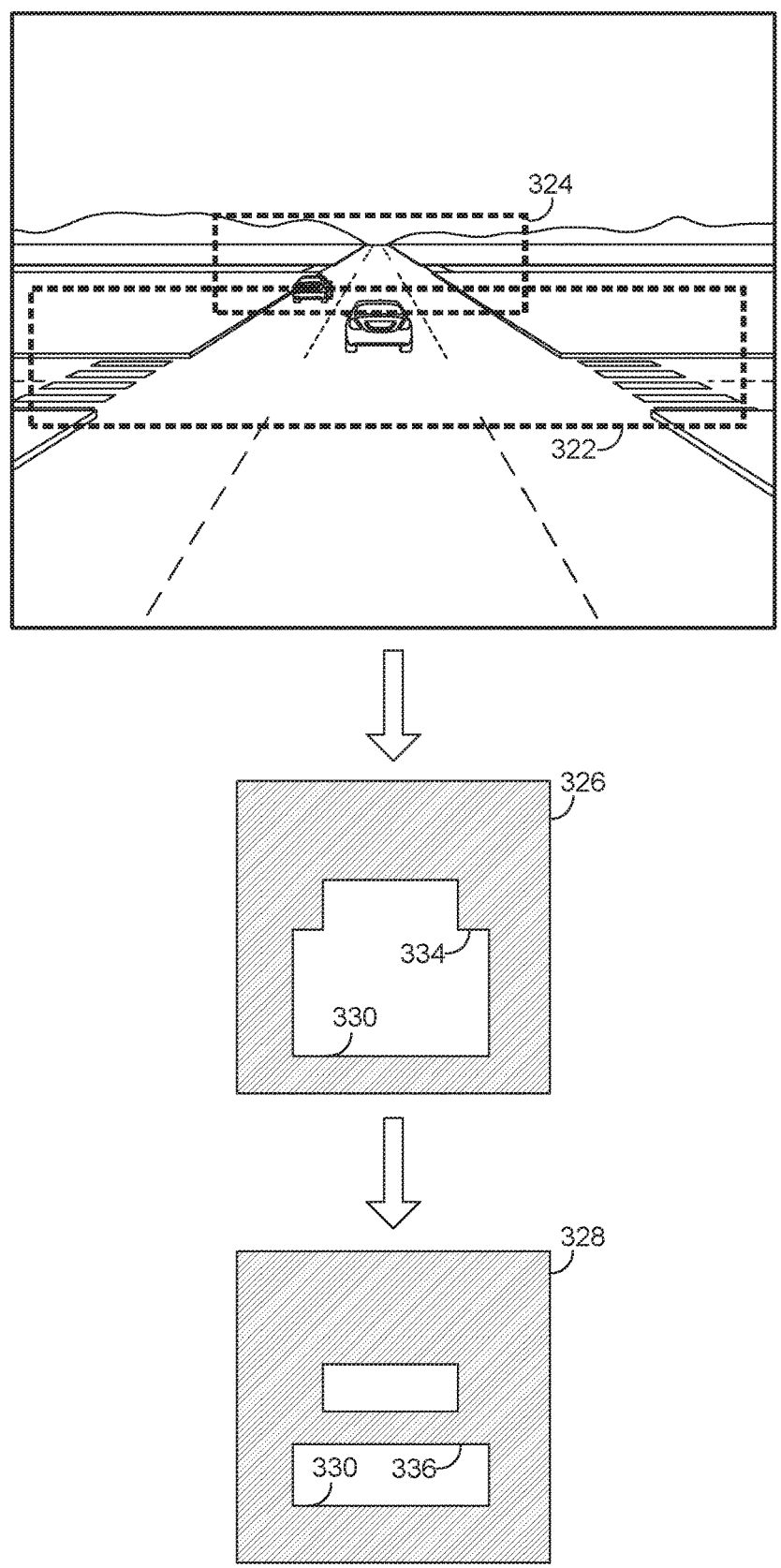

As examples of intersection coverage maps 126, and referring to FIGS. 3A-3B, FIGS. 3A-3B illustrate intersection coverage maps for use in ground truth generation for training a machine learning model to detect and classify intersections, in accordance with some embodiments of the present disclosure. With respect to FIGS. 3A-3B, the white portions of intersection coverage maps (e.g., initial intersection coverage maps 304, 326 and update intersection coverage maps 306, 328) may correspond to confidence values above a threshold (e.g., 0.8, 0.9, 1, etc.) that indicate an intersection—or bounding box corresponding thereto—is associated with the pixels therein. The patterned portions (e.g., diagonal striping) may correspond to confidence values below a threshold (e.g., 0.7, 0.6, etc.) that indicate an intersection—or a bounding box corresponding thereto—is not associated with the pixels therein. As such, each pixel within a white region may be determined to correspond to an intersection while each pixel within a patterned region may be determined not to correspond to an intersection. During training, the confidence values encoded to the white regions may be 1.0, while the confidence values encoded to the patterned regions may be 0.0. However, during deployment, the predictions may be compared to a threshold, as described above, to determine whether the pixels or points correspond to an intersection or not.

FIG. 3A illustrates encoding an intersection coverage map by reducing a size of an intersection coverage map 126 based on a size of the initial bounding box being above a size threshold. Image 300 is annotated with a bounding box 302 corresponding to an intersection in an instance of sensor data. In an initial intersection coverage map 304, some or all of the pixels corresponding to the bounding box 302 may be encoded with intersection location information. In response to the initial size of the bounding box 302 being greater than a threshold, the initial bounding box 302 intersecting another bounding box (not shown), and/or another criteria, the size of the initial coverage map 304 corresponding to the intersection may be reduced to generate an updated intersection coverage map 306 to represent the same intersection. The updated intersection coverage map 306 may be generated by adjusting values corresponding to a portion of the pixels or points within the bounding box 302 (e.g., points or pixels from the top of the initial bounding box 302). As a result, in some non-limiting embodiments, a bottom edge 310 of the initial intersection coverage map 304 may be maintained as the bottom edge for the updated intersection coverage map 306 while the top edge 312 may be cropped down to the updated top edge 314. In some embodiments, the reduced size of the updated intersection coverage map 306 may be based on a predetermined size threshold, such as to include pixels corresponding to a first 100, 200, 300, etc. rows of the bounding box 302.

FIG. 3B illustrates encoding an intersection coverage map by reducing a size of an intersection coverage map based on a first bounding box 322 overlapping with a second bounding box 324 representing another intersection, in accordance with some embodiments of the present disclosure. Image 320 is annotated with the first bounding box 322 corresponding to a first intersection and the second bounding box 324 corresponding to a second intersection in an instance of sensor data 102 (e.g., the image 320). In an initial intersection coverage map 326, the pixels or points within the initial first bounding box 322 and the second bounding box 324 may be encoded with intersection location information. Based on the first bounding box 322 and the second bounding box 324 overlapping, the initial intersection coverage map 326 may reflect the same, such that some values corresponding to the overlapping region may represent both intersections and thus may result in training the machine learning model(s) 104 to inaccurately predict the bounding box locations. As a result, the initial size of the initial intersection coverage map 326 may be reduced to generate an updated intersection coverage map 328. The updated intersection coverage map 328 may be generated by changing values corresponding to a portion of the pixels or points within the first bounding box 322 (e.g., a top portion of pixels or points, a side portion, a bottom portion, etc.). In some embodiments, the updated coverage map 328 may include a bottom edge 330 that is the same as the initial intersection coverage map 326 but may include a top edge 336 that is revised from a top edge 334 of the initial intersection coverage map 326. As depicted, the top edge may be cropped down to the updated top edge 336. The reduced size of the updated coverage map 328 may be based on predetermined size threshold, as described herein. As described herein, reducing the size of one or more intersection coverage maps 126 may help the machine learning model(s) 104 learn to clearly delineate multiple bounding boxes for intersections thereby enabling the machine learning model(s) 104 to accurately and efficiently detect multiple intersections in a single instance of the sensor data 102.

Referring again to FIG. 1, the distance(s) 130 for each intersection in an image representative of sensor data 102 may then be used to determine which intersection is located in which range. Distance(s) 130 may be determined as a distance value based on a portion (e.g., a bottom edge of the bounding box(es) 118A) of the intersection. As such, distance(s) 130 from pixels or points may be determined and encoded to generate a distance coverage map 132, or another distance representation. For example, one or more of the pixels or points may include an associated distance. The associated distance may include the distance—in image-space—from the pixel to a portion of an intersection(s), such as a nearest intersection to the pixel or point, to each intersection detected, etc. The portion of the intersection may include an entry point (e.g., corresponding to a bottom edge of a bounding box), a center point (e.g., a centroid of a bounding box), and/or another point corresponding to the intersection.

In some examples, distance(s) 130 may be determined based on motion data representing motion of the vehicle 700 from a first location to at a time of capturing the image data to a second location corresponding to the intersection and/or any point there between. For example, when an instance of the sensor data is 102 is captured, motion information of the vehicle 700 may be tracked as the vehicle 700 traverses the field of view represented in the instance of the sensor data 102. As such, the world-space distance traveled by the vehicle 700 may be determined and projected into image-space and correlated with pixels or points of the sensor data 102. As a result, the actual distance traveled by the vehicle 700 may be used to accurately determine the distance to intersections represented within the instance of the sensor data 102. The machine learning model(s) 104 may then be trained to compute distances to intersections, where the training is based on accurate distance information generated by the ego-motion information. In some embodiments, these distances of the intersections and/or the bounding box(es) 118A corresponding thereto may be encoded in the form of a distance coverage map(s) 132. For example, pixels (e.g., each pixel) between a bottom edge of the sensor data instance and a portion of the intersection (e.g., a bottom edge of the bounding box, an entry point to the intersection, etc.) may be encoded—within the distance coverage map(s) 132—with a distance value corresponding to a distance from a point on the vehicle 700 (e.g., an origin point) to a point or portion of the intersection or a bounding box corresponding thereto.

In addition, pixels or points (e.g., each pixel or point, each pixel or point corresponding to a coverage map, such as a reduced-size coverage map) within the bounding box(es) 118B may have attribute(s) 118B encoded thereto. For a non-limiting example, where the machine learning model 104 is trained to predict a certain number of attributes, each pixel having attributes encoded thereto may include a confidence of one for each classification associated therewith and a zero for others.

In some non-limiting embodiments, and because the spatial resolution of the sensor data 102 being applied to the machine learning model(s) 104 may be different—e.g., greater than, less than, etc.—the output spatial resolution corresponding to predictions of the machine learning model(s) 104, the ground truth information may be encoded such that the predictions may easily be converted back to the input spatial resolution. For example, anchor points or pixels may be used. In such examples, pixels or points at the output spatial resolution may be associated with known conversions back to the input spatial resolution, and the predictions at the output spatial resolution may actually correspond directly to the input spatial resolution. As such, where a prediction for a bounding box location includes pixel distances to a left, top, right, and/or bottom edge of the bounding shape, this prediction of the machine learning model(s) 104 at the output spatial resolution may actually correspond to the input spatial resolution. As an example, where a prediction is for a fourth pixel along a row at the output resolution, this prediction may be directly attributed to an eighth pixel along a row at the input resolution, such that a prediction of fifty pixels to the left edge of a bounding box at the output spatial resolution actually corresponds to fifty pixels to the left edge of a bounding box at the input spatial resolution. In this way, the machine learning model(s) 104 may require less compute as the output spatial resolution does not need to match the input spatial resolution, thereby allowing for down-sampling during processing without requiring up-sampling thereafter.

Once the ground truth data 122 is generated for each instance of the sensor data 102 (e.g., for each image where the sensor data 102 includes image data), the machine learning model(s) 104 may be trained using the ground truth data 122. For example, the machine learning model(s) 104 may generate output(s) 106, and the output(s) 106 may be compared—using the loss function(s) 140—to the ground truth data 122 corresponding to the respective instance of the sensor data 102. As such, feedback from the loss function(s) 140 may be used to update parameters (e.g., weights and biases) of the machine learning model(s) 104 in view of the ground truth data 122 until the machine learning model(s) 104 converges to an acceptable or desirable accuracy. Using the process 100, the machine learning model(s) 104 may be trained to accurately predict the output(s) 106 from the sensor data 102 using the loss function(s) 140 and the ground truth data 122. In some examples, different loss functions 140 may be used to train the machine learning model(s) 104 to predict different outputs 106. For example, a first loss function 140 may be used for comparing the intersection coverage map(s) 110 and 126 and a second loss function 140 may be used for comparing the distance coverage map(s) 116 and 132. As such, in non-limiting embodiments, one or more of the output channels may be trained using a different loss function 140 than another of the output channels.

The machine learning model(s) 104 may use the sensor data 102 to compute the output(s) 106, which may ultimately be applied to a decoder or one or more other post-processing components (described in more detail herein at least with respect to FIG. 4) to generate intersection coordinates, intersection distances, attributes, and/or other information. Although examples are described herein with respect to using deep neural networks (DNNs), and specifically convolutional neural networks (CNNs), as the machine learning model(s) 104 (e.g., with respect to FIGS. 1 and 4), this is not intended to be limiting. For example, and without limitation, the machine learning model(s) 104 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), lane detection algorithms, computer vision algorithms, and/or other types of machine learning models.

As an example, such as where the machine learning model(s) 104 include a CNN, the machine learning model(s) 104 may include any number of layers. One or more of the layers may include an input layer. The input layer may hold values associated with the sensor data 102 (e.g., before or after post-processing). For example, when the sensor data 102 is an image, the input layer may hold values representative of the raw pixel values of the image(s) as a volume (e.g., a width, a height, and color channels (e.g., RGB), such as 32×32×3).

One or more layers may include convolutional layers. The convolutional layers may compute the output of neurons that are connected to local regions in an input layer, each neuron computing a dot product between their weights and a small region they are connected to in the input volume. A result of the convolutional layers may be another volume, with one of the dimensions based on the number of filters applied (e.g., the width, the height, and the number of filters, such as 32×32×12, if 12 were the number of filters).

One or more of the layers may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers may include a pooling layer. The pooling layer may perform a down sampling operation along the spatial dimensions (e.g., the height and the width), which may result in a smaller volume than the input of the pooling layer (e.g., 16×16×12 from the 32×32×12 input volume).

One or more of the layers may include one or more fully connected layer(s). Each neuron in the fully connected layer(s) may be connected to each of the neurons in the previous volume. The fully connected layer may compute class scores, and the resulting volume may be 1×1×number of classes. In some examples, the CNN may include a fully connected layer(s) such that the output of one or more of the layers of the CNN may be provided as input to a fully connected layer(s) of the CNN. In some examples, one or more convolutional streams may be implemented by the machine learning model(s) 104, and some or all of the convolutional streams may include a respective fully connected layer(s).

In some non-limiting embodiments, the machine learning model(s) 104 may include a series of convolutional and max pooling layers to facilitate image feature extraction, followed by multi-scale dilated convolutional and up-sampling layers to facilitate global context feature extraction.

Although input layers, convolutional layers, pooling layers, ReLU layers, and fully connected layers are discussed herein with respect to the machine learning model(s) 104, this is not intended to be limiting. For example, additional or alternative layers may be used in the machine learning model(s) 104, such as normalization layers, SoftMax layers, and/or other layer types.

In embodiments where the machine learning model(s) 104 includes a CNN, different orders and numbers of the layers of the CNN may be used depending on the embodiment. In other words, the order and number of layers of the machine learning model(s) 104 is not limited to any one architecture.

In addition, some of the layers may include parameters (e.g., weights and/or biases), such as the convolutional layers and the fully connected layers, while others may not, such as the ReLU layers and pooling layers. In some examples, the parameters may be learned by the machine learning model(s) 104 during training. Further, some of the layers may include additional hyper-parameters (e.g., learning rate, stride, epochs, etc.), such as the convolutional layers, the fully connected layers, and the pooling layers, while other layers may not, such as the ReLU layers. The parameters and hyper-parameters are not to be limited and may differ depending on the embodiment.

Figure 4:
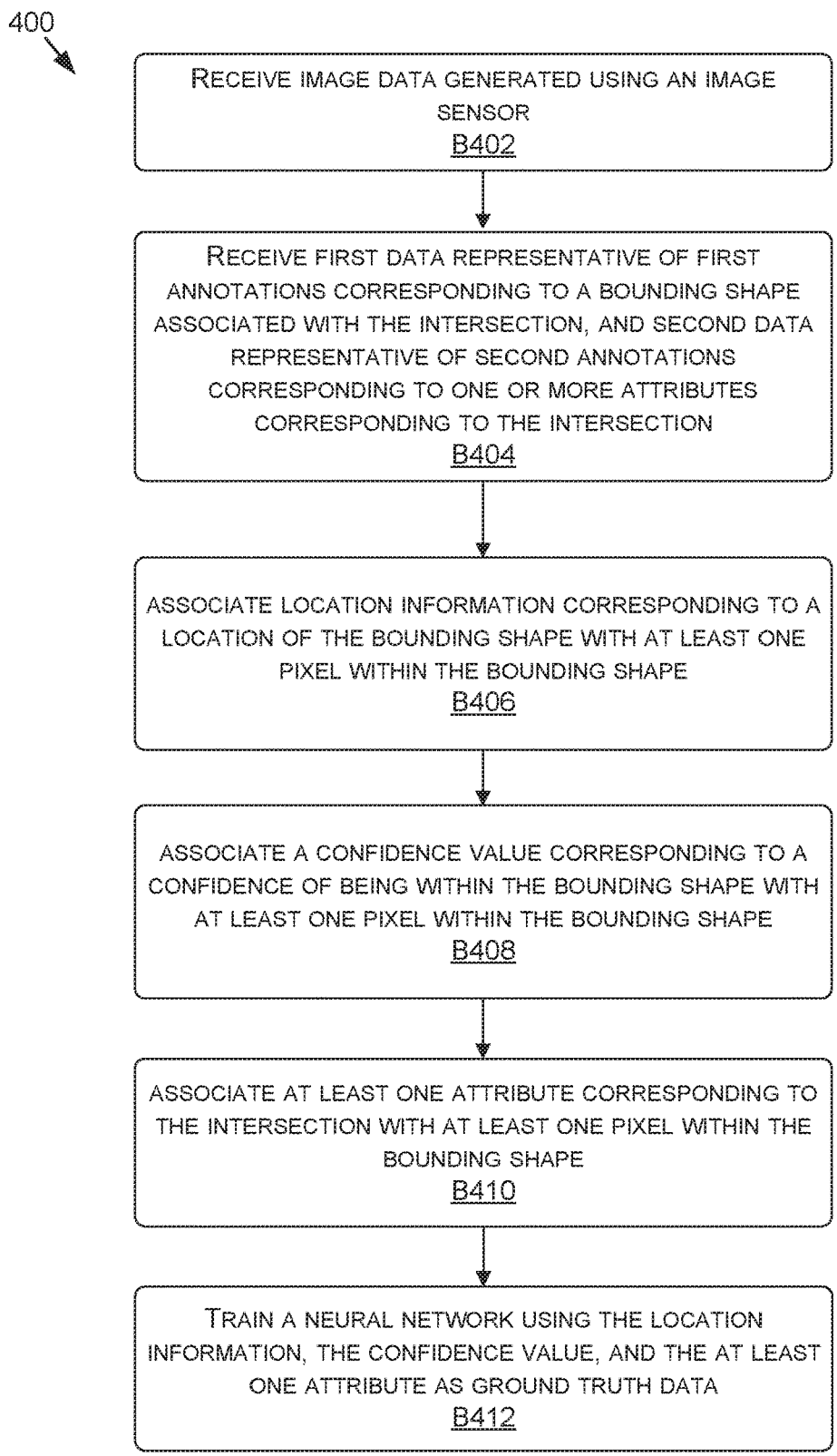
FIG. 4 is a flow diagram illustrating an example method for training a neural network to detect and classify intersections, in accordance with some embodiments of the present disclosure.

Now referring to FIG. 4, each block of method 400, described herein, comprises a computing process that may be performed using any combination of hardware, firmware, and/or software. For instance, various functions may be carried out by a processor executing instructions stored in memory. The method 400 may also be embodied as computer-usable instructions stored on computer storage media. The method 400 may be provided by a standalone application, a service or hosted service (standalone or in combination with another hosted service), or a plug-in to another product, to name a few. In addition, method 400 is described, by way of example, with respect to the training process 100 of FIG. 1. However, this method may additionally or alternatively be executed by any one system, or any combination of systems, including, but not limited to, those described herein.

FIG. 4 is a flow diagram showing a method 400 for training a neural network to detect and classify intersections, in accordance with some embodiments of the present disclosure. The method 400, at block B402, includes receiving image data generated using an image sensor. For example, an instance of sensor data 102 (e.g., an image) may be received and/or generated, where the instance of the sensor data 102 depicts a field of view and/or a sensor field of a sensor of the vehicle 700 that includes one or more intersections.

The method 400, at block B404, includes receiving first data representative of first annotations corresponding to a bounding shape associated with the intersection, and second data representative of second annotations corresponding to one or more attributes of or concerning the intersection. For example, data representative of annotations 118 may be generated and/or received, where annotations include bounding box(es) 118A corresponding to the intersection and attribute(s) 118B for the bounding box(es) 118A.

The method 400, at block B406, includes associating location information corresponding to a location of the bounding shape with at least one pixel within the bounding shape based at least in part on the first data. For example, bounding box(es) 118A may include location information corresponding to the edges of the bounding box(es) 118A, vertices of the bounding box(es) 118A, etc.

The method 400, at block B408, includes associating a confidence value corresponding to a confidence of being within the bounding shape with at least one pixel within the bounding shape based at least in part on the first data. For example, pixels in the bounding box(es) 118A may be associated with confidence values indicating a confidence that the pixel belongs to the bounding box(es) 118A.

The method 400, at block B410, includes associating at least one attribute corresponding to the intersection with at least one pixel within the bounding shape based at least in part on the second data. For example, pixels in the bounding box(es) 118A may be encoded or associated with attribute(s) 118B to generate and/or identify intersection attribute(s) 128.

The method 400, at block 412, includes training a neural network using the location information, the confidence value, and the at least one attribute as ground truth data. For examples, the location information, the attribute(s) 128, and the confidence values may be used as ground truth data 122 to train the machine learning model(s) 104 to detect and classify intersections.

Referring now to FIG. 5, FIG. 5 is a data flow diagram illustrating an example process 500 for detecting and classifying intersections using outputs from sensors of a vehicle in real-time or near real-time, in accordance with some embodiments of the present disclosure. The sensor data 102 may be similar to that described herein at least with respect to FIG. 1. During deployment, the sensor data 102 may be applied to the machine learning model(s) 104 that has been trained according to the process 100, for example, to compute bounding box coordinates 108, intersection coverage map(s) 110, intersection attribute(s) 112, distance(s) 114, and/or distance coverage map(s) 116 using the sensor data 102. As such, the machine learning model(s) 104 may output—or regress on—one or more of the outputs 106.

The output(s) 106 may be applied to a post-processor 502 to generate decoded output(s) 504. In some examples, the post-processor 502 may use one or more post-processing algorithms (e.g., temporal smoothing, similarity analysis, filtering, etc.) to compute the decoded output(s) 504. For example, the post-processor 502 may use the outputs 106 to determine locations, distances, and/or classifications of the intersection which may then be used by vehicle 700 to navigate the intersection (e.g., when to stop, where to stop, how long to stop). The decoded output(s) 504 may include attribute(s) 506, intersection coordinates 508, intersection distance(s) 510, and/or other information corresponding to the intersection (e.g., line segments corresponding to the intersection which may be used to generate visualizations of the intersection for debugging, etc.).

The bounding box coordinates 108 and/or intersection coverage map(s) 110 may be used by the post-processor 502 to determine intersection coordinates 508. For example, the confidence values for pixels within the intersection coverage map(s) 110 may be leveraged to determine which bounding box coordinates 108 should be used as bounding box proposals for determining the intersection coordinates 508. As such, a combination of the bounding box location proposals from pixels within the intersection coverage map(s) 110 (e.g., pixels or points that have a confidence above a threshold, which may be pixels or points within a reduced-size coverage map based on the training within the process 100, as described herein) may be used to generate a final prediction of intersection coordinates 508 (e.g., location of the bounding box, dimensions of the bounding box, etc.). In some embodiments, a random sample consensus (RANSAC) algorithm may be used to determine the final prediction from the individual proposals corresponding to respective pixels. In some examples, a similarity threshold may be used to compare the confidence values of the pixels in the intersection coverage map(s) 110 based on a hyper-parameter optimization algorithm.

In addition, the pixels or points of the intersection coverage map(s) 110 that voted (e.g., had a confidence above a threshold) for the final intersection coordinates may then be used by the post-processor 502 to determine attribute(s) 506 of the final bounding box corresponding to the intersection. For example, a number of pixels with the same predicted attribute(s) 112 may be counted to determine final attribute(s) 508 for the final intersection coordinates 508 for an intersection. For example, where a threshold number of pixels within the intersection coverage map(s) 110 and/or the bounding box are all associated with the same attribute, the attribute may be determined to be a final attribute associated with the intersection. For each attribute(s) 112 associated with a bounding box, the process may be repeated to determine a set of final attribute(s) 506 for that intersection.

The post-processor 502 may further decode the output(s) 106 to determine intersection distance(s) 510 from the vehicle 700. The distance coverage map(s) 116 and the distance(s) 114 corresponding to detected intersections may be leveraged to determine final intersection distance(s) 510 of the intersection from the vehicle 700. In some examples, the final intersection coordinate(s) 508 may be used to determine the intersection distance(s) 510 by leveraging the bottom edge of the corresponding intersection to calculate a pixel distance to the vehicle 700 (e.g., corresponding to a bottom edge or row of pixels of the instance of the sensor data 102).

Further, the post-processor 502 may perform a temporal analysis on bounding boxes, distances, and/or attributes to confirm stability, robustness, and accuracy of the output(s) 106. The current prediction (e.g., intersection coordinates 508, attribute(s) 506, intersection distance(s) 510, bounding box coordinates 108, intersection coverage map(s) 110, intersection attribute(s) 112, distance(s) 114, distance coverage map(s) 116) for a current instance of the sensor data 102 may be weighted against a number of prior predictions corresponding to prior instances (e.g., images, frames) of the sensor data 102. In some examples, temporal filtering (e.g., statistical filtering) may be performed over multiple predictions corresponding to previous consecutive instances of the sensor data 102. In such examples, the pixel coordinates corresponding to an intersection may be converted into spatial 3D coordinates in reference to any known 3D coordinate system. Motion of the vehicle 700 between consecutive images of the sensor data 102 may be leveraged to accurately perform the temporal filtering. The previous predictions may be adjusted using the motion to track the new spatial position of the vehicle 700. The predictions for the current and the previous images may then be statistically filtered to determine the final predictions related to the intersection. In some embodiments, a probability density function may be estimated and a peak value matching the probability density function to a maximum likelihood of the prediction being correct may be used to determine the final predictions.

The decoded output(s) 504 may be used to perform one or more operations by a control component(s) 518 of the vehicle 700. For example, a perception layer of an autonomous driving software stack may update information about the environment based on the intersection information, a world model manager may update the world model to reflect the location, distance, attributes, and/or other information about the intersection(s), a control layer may use the information for determining controls when approaching, navigating through, and/or exiting the intersection(s) (e.g., based on attributes such as wait conditions, size of the intersection, distance to the intersection, etc.).

In some embodiments, during deployment of the system, a converter 512 may be leveraged by a label generator 516 to automatically generate new ground truth data for further training the machine learning model(s) 104 or other machine learning models. The distance traveled by the vehicle 700 from a world-space 3D location of capture of an image of sensor data 102 to a world-space location 3D of the intersection (e.g., the entry to the intersection) may be tracked as the distance history 514. For example, between instances of the sensor data 102, the location of all intersections in view and the distance to each intersection as traveled by the vehicle 700 may be tracked until the vehicle 700 reaches an entry point to the intersection. The distance may then be back-propagated to each of the instances and encoded as the distance(s) 130 to the intersection in the ground truth data 122 for training the machine learning model(s) 104. As such, the entry point location to the intersection may then be back-projected into previous images (e.g., instance) of the sensor data 102 to train the machine learning model(s) 104 to calculate distance(s) 114 to intersections. The distance(s) 130 may be encoded to generate a distance coverage map(s) 132 corresponding to distance(s) 130, and/or may be used to encode a distance value to pixels of the image (e.g., every pixel, pixels corresponding to the intersection, pixels outside of intersections, etc.). In this way, motion of the vehicle may be leveraged to generate ground truth data 122 to train the machine learning model(s) 104.

Figure 6:
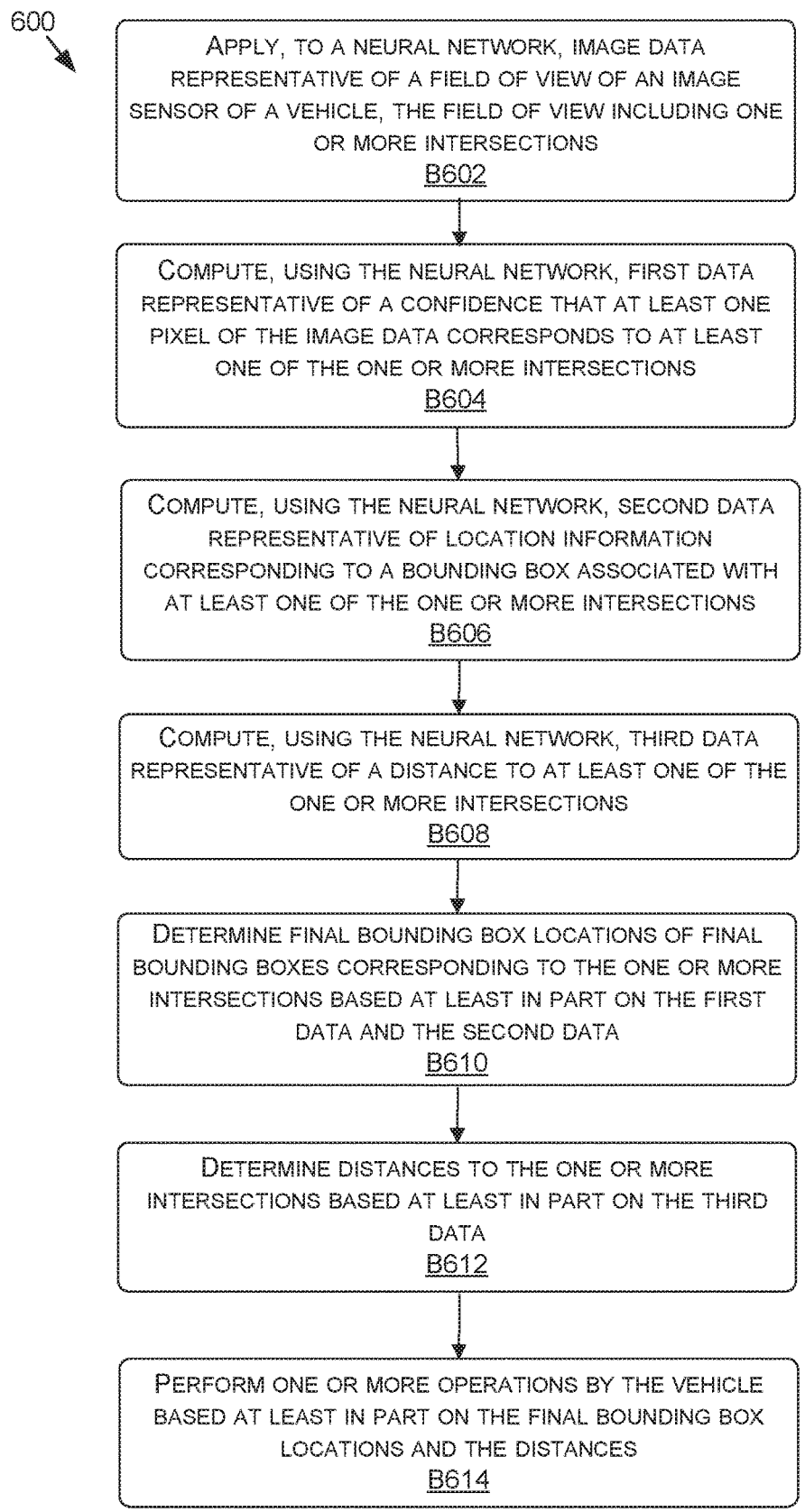
FIG. 6 is a flow diagram illustrating an example method for detecting and classifying intersections, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, method 600 is described, by way of example, with respect to the training process 500 of FIG. 5. However, this method may additionally or alternatively be executed by any one system, or any combination of systems, including, but not limited to, those described herein.

FIG. 6 is a flow diagram showing a method 600 for detecting and classifying intersections, in accordance with some embodiments of the present disclosure. The method 600, at block B602, includes applying, to a neural network, image data representative of a field of view of an image sensor of a vehicle, the field of view including one or more intersections. For example, the sensor data 102 representing an image of with one or more intersections in a field of view of an image sensor of vehicle 700 may be applied to the machine learning model(s) 104.

The method 600, at block B604, includes computing, using the neural network, first data representative of a confidence that at least one pixel of the image data corresponds to at least one of the one or more intersections. For example, the machine learning model(s) 104 may output an intersection coverage map(s) 110 (reduced in size, in embodiments) representing confidence values that at least one pixel of the image data corresponds to an intersection or a bounding box representative thereof.

The method 600, at block B606, includes computing, using the neural network, second data representative of location information corresponding to a bounding box associated with at least one of the one or more intersections. For example, the machine learning model(s) 104 may output bounding box coordinates 108 representing location information corresponding to a bounding box(es) associated with one or more intersections.

The method 600, at block B608, includes computing, using the neural network, third data representative of a distance to at least one of the one or more intersections. For example, the machine learning model(s) 104 may output distance(s) 114 of the intersections and/or distance coverage map(s) 116.

The method 600, at block B610, includes determining final bounding box locations of final bounding boxes corresponding to the one or more intersections based at least in part on the first data and the second data. For example, the post-processor 502 may decode output(s) 106 to determine decoded output(s) 504 including final intersection coordinates 508.

The method 600, at block B612, includes determining distances to the one or more intersections based at least in part on the third data. For example, the post-processor 502 may decode output(s) 106 to determine decoded output(s) 504 including the final intersection distance(s) 510 of the intersections from the vehicle 700.

The method 600, at block B614, includes performing one or more operations by the vehicle based at least in part on the final bounding box locations and the distances. For example, the control component(s) 518 may perform one or more actions based on the decoded output(s) 504.

Example Autonomous Vehicle

Figure 7A:
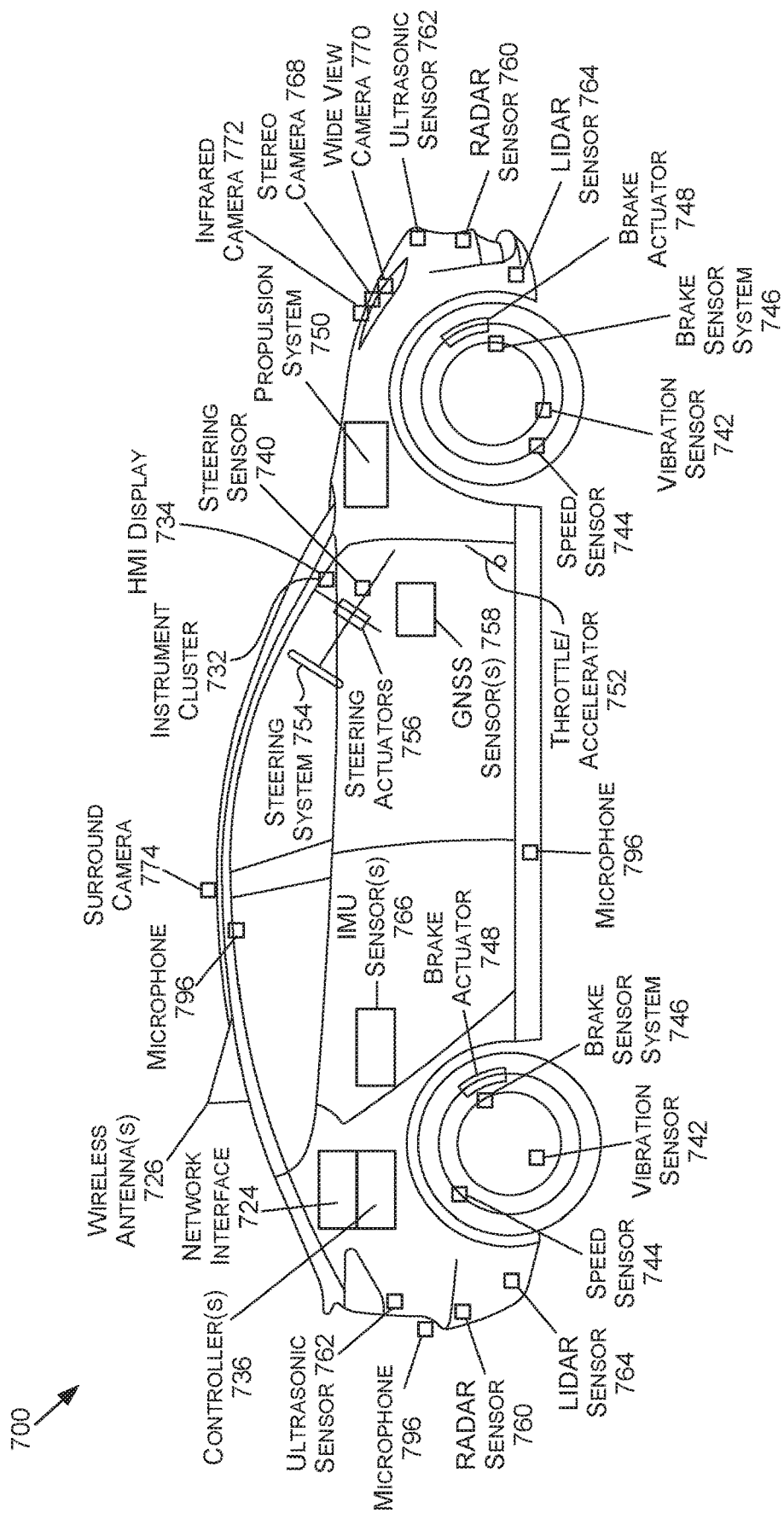
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. For example, the vehicle 700 may be capable of conditional automation (Level 3), high automation (Level 4), and/or full automation (Level 5), depending on the embodiment.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
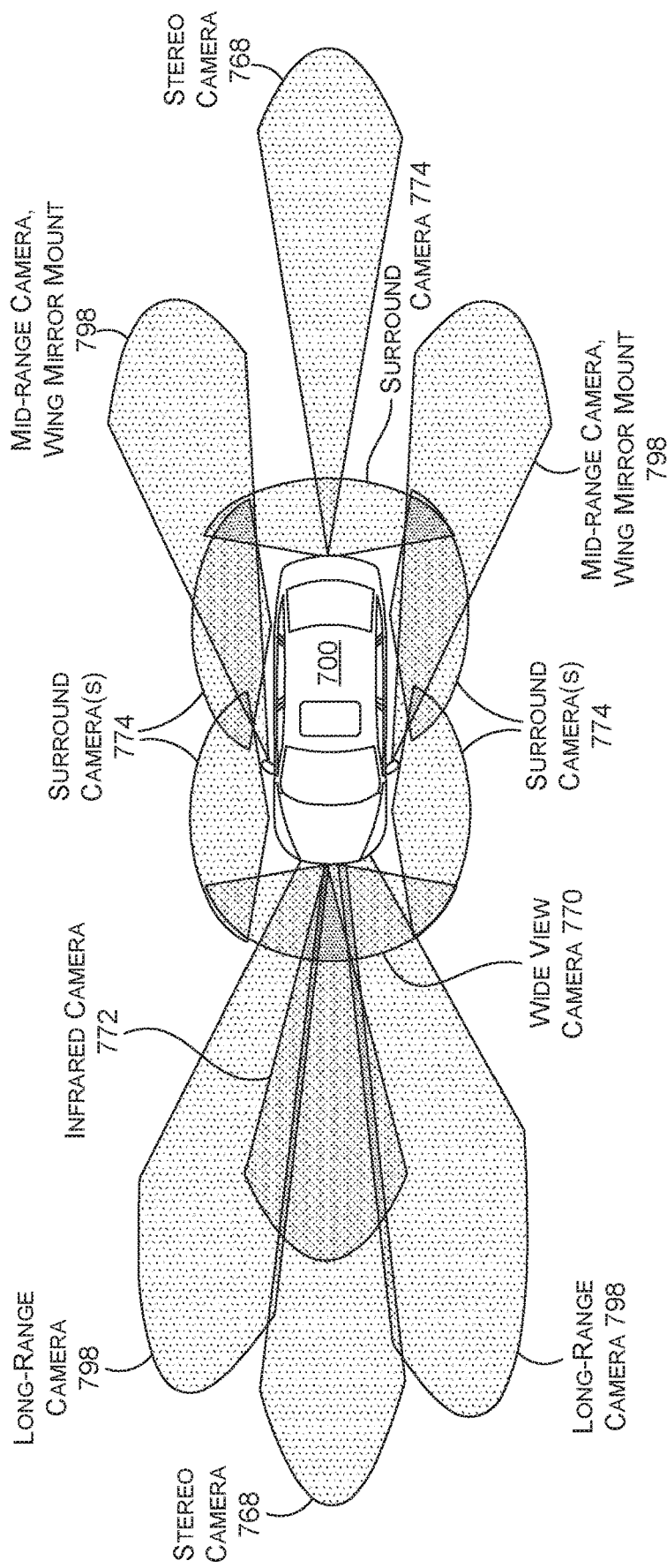
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 720 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
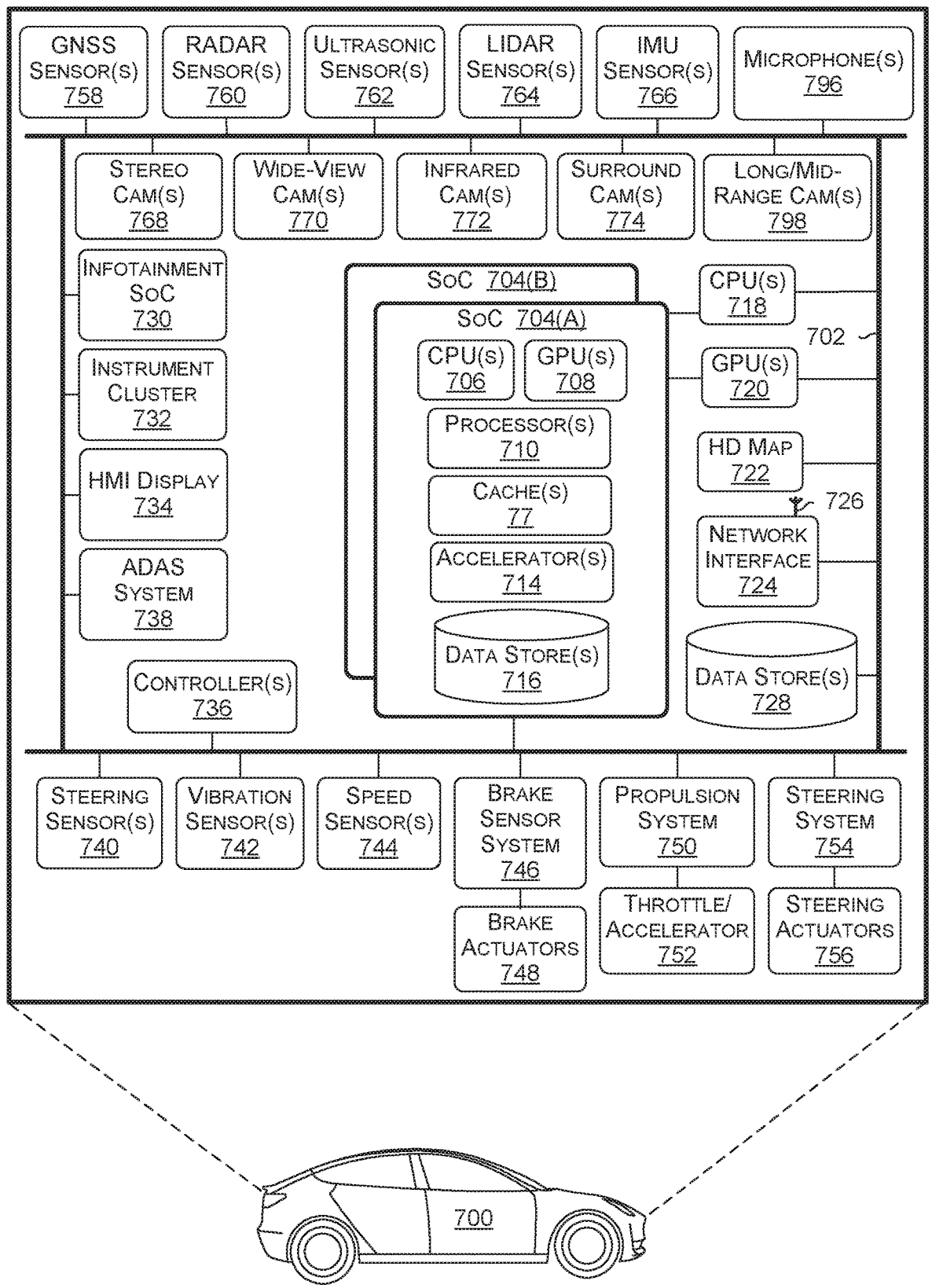
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time. The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving.

The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS and/or assisted GPS sensors), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 720-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
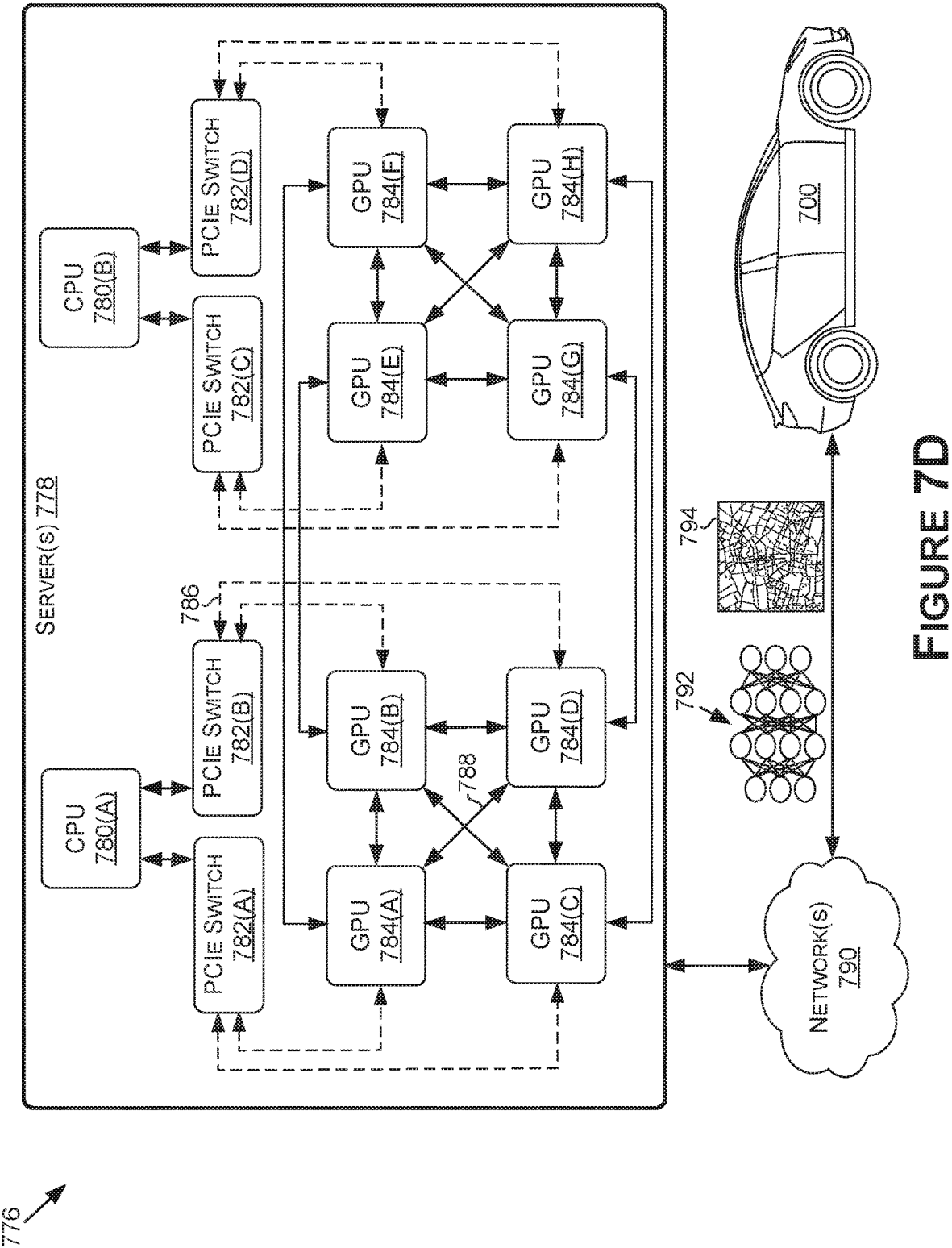
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
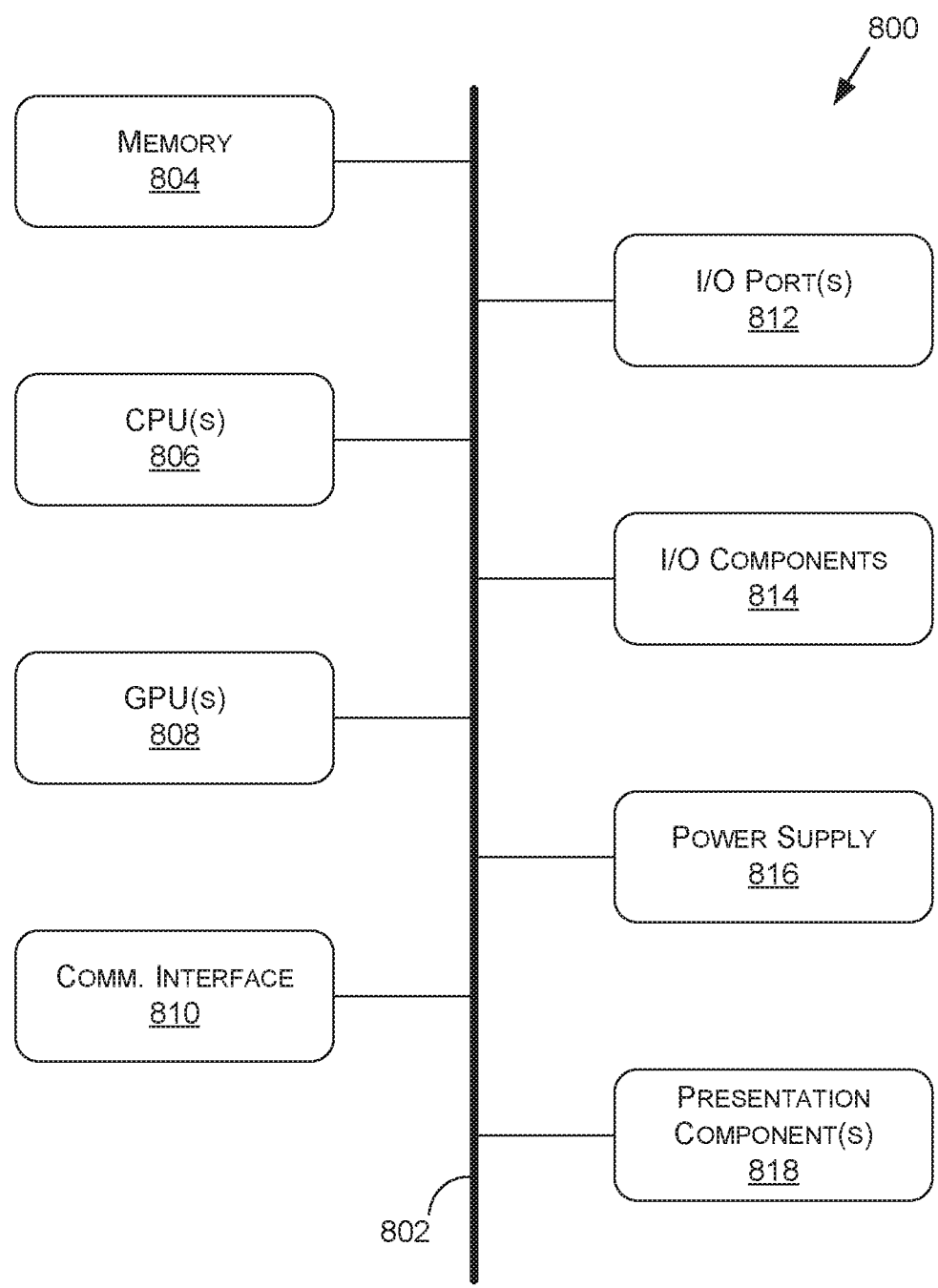
FIG. 8 is a block diagram of an example computing device suitable for use in implementing some embodiments of the present disclosure.

FIG. 8 is a block diagram of an example computing device 800 suitable for use in implementing some embodiments of the present disclosure. Computing device 800 may include a bus 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, and one or more presentation components 818 (e.g., display(s)).

Although the various blocks of FIG. 8 are shown as connected via the bus 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "handheld device," "game console," "electronic control unit (ECU)," "virtual reality system," and/or other device or system types, as all are contemplated within the scope of the computing device of FIG. 8.

The bus 802 may represent one or more busses, such as an address bus, a data bus, a control bus, or a combination thereof. The bus 802 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 806 may be configured to execute the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an ARM processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

The GPU(s) 808 may be used by the computing device 800 to render graphics (e.g., 3D graphics). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data. The display memory may be included as part of the memory 804. The GPU(s) 708 may include two or more GPUs operating in parallel (e.g., via a link). When combined together, each GPU 808 may generate pixel data for different portions of an output image or for different output images (e.g., a first GPU for a first image and a second GPU for a second image). Each GPU may include its own memory, or may share memory with other GPUs.

In examples where the computing device 800 does not include the GPU(s) 808, the CPU(s) 806 may be used to render graphics.

The communication interface 810 may include one or more receivers, transmitters, and/or transceivers that enable the computing device 700 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
applying, to one or more neural networks, image data representative of a field of view including one or more intersections;
computing, using the one or more neural networks and based at least on the image data, output data including:
first data representative of a confidence that at least one pixel of the image data corresponds to at least one of the one or more intersections;
second data representative of location information corresponding to a bounding shape associated with at least one of the one or more intersections; and
third data representative of a distance to at least one of the one or more intersections;
determining one or more final bounding shape locations of one or more final bounding shapes corresponding to the one or more intersections based at least on the first data and the second data;
determining one or more distances to the one or more intersections based at least on the third data; and
performing one or more operations by a vehicle based at least on the one or more final bounding shape locations and the one or more distances to the one or more intersections.

2. The method of claim 1, further comprising:
computing, using the one or more neural networks and based at least on the image data, fourth data representative of one or more attributes corresponding to the one or more intersections,
wherein the performing the one or more operations by the vehicle is further based at least on the one or more attributes.

3. The method of claim 2, wherein the one or more attributes correspond to one or more types of wait conditions associated with the one or more intersections.

4. The method of claim 1, wherein the first data represents a pixel-based coverage map, wherein an individual pixel determined to correspond to an intersection in the pixel-based coverage map is uniformly weighted.

5. The method of claim 1, wherein the location information includes a pixel distance to one or more of a left edge, a right edge, a top edge, or a bottom edge of the bounding shape.

6. The method of claim 5, wherein the pixel corresponds to an output spatial resolution of the one or more neural networks and the pixel distance corresponds to an input spatial resolution of the one or more neural networks.

7. The method of claim 1, wherein the location information includes pixel coordinates corresponding to at least one vertex of the bounding shape.

8. The method of claim 1, further comprising:
computing, using the one or more neural networks and based at least on the image data, fourth data representative of, for an individual pixel, one or more attributes associated with the one or more intersections associated with the individual pixel;
for at least a final bounding shape of the one or more final bounding shapes:
calculating a number of pixels within the final bounding shape associated with a same attribute of the one or more attributes; and
when the number of pixels exceeds a threshold, associating the same attribute with an intersection of the one or more intersections corresponding to the final bounding shape.

9. The method of claim 1, wherein the distance corresponds to a bottom edge of a final bounding shape of the one or more final bounding shapes, the final bounding shapes being associated with an intersection of the one or more intersections.

10. The method of claim 1, wherein at least one of the determining the one or more final bounding shapes locations or the determining the one or more distances includes weighting a current prediction of the one or more neural networks corresponding to a current instance of the image data against one or more prior predictions of the one or more neural networks corresponding to one or more prior instances of the image data.

11. The method of claim 1, wherein the determining the one or more final bounding shape locations includes, for an individual final bounding shape of the one or more final bounding shapes, using the location information corresponding to a plurality of pixels to determine a corresponding final bounding shape location.

12. The method of claim 11, wherein the using the location information corresponding to the plurality of pixels includes applying random sample consensus (RANSAC) to the location information.

13. The method of claim 1, wherein fourth data corresponding to motion of the vehicle through a portion of an environment corresponding to the field of view is used to generate ground truth data corresponding to the image data for further training the one or more neural networks to predict the one or more distances to the one or more intersections.

14. The method of claim 1, wherein the one or more neural networks are trained to compute the location information for a subset of pixels corresponding to the bounding shape, the subset of pixels including pixels extending from a bottom edge of the bounding shape to a predetermined threshold pixel height.

15. The method of claim 1, further comprising:
determining a subset of pixels that correspond to the one or more intersections based at least on the first data; and
determining pixel locations for pixels of the subset of pixels based at least on the second data.

16. The method of claim 15, wherein the determining the one or more final bounding shape locations comprises aggregating the pixel locations.

17. The method of claim 15, wherein, based at least on the one or more neural networks being trained to compute cropped coverage maps, the subset of pixels includes less pixels than a number of pixels actually corresponding to an intersection of the one or more intersections.

18. A method comprising:
determining, using one or more neural networks and based at least on image data generated by a vehicle, one or more locations of one or more intersections within an environment; and
performing one or more operations by the vehicle based at least on the one or more locations of the one or more intersections,
wherein the one or more neural networks are trained by at least:
receiving second image data generated using an image sensor, the second image data depicting a field of view of the image sensor within a second environment including at least one intersection;

receiving first data representative of one or more first annotations corresponding to a bounding shape associated with the at least one intersection, and second data representative of one or more second annotations corresponding to one or more attributes corresponding to the at least one intersection;

based at least on the first data, associating location information corresponding to a location of the bounding shape with at least one pixel within the bounding shape;

based at least on the first data, associating a confidence value corresponding to a confidence of being within the bounding shape with at least one pixel within the bounding shape;

based at least on the second data, associating at least one attribute corresponding to the at least one intersection with at least one pixel within the bounding shape; and training the one or more neural networks using the location information, the confidence value, and the at least one attribute as ground truth data.

19. The method of claim 18, wherein the associating the confidence value with the at least one pixel generates an initial region within a coverage map that corresponds to the bounding shape, and the method further comprises:

reducing a size of the initial region to generate an updated region smaller than the initial region, the reducing the size being based at least on a distance to the bounding shape being below a threshold distance.

20. The method of claim 19, wherein the reducing the size of the initial region includes cropping a top portion of the initial region such that the updated region includes a same bottom edge as the initial region and an updated upper edge with respect to the initial region, the updated upper edge being less pixels away from the same bottom edge as an upper edge of the initial region.

21. The method of claim 19, wherein a height of the updated region corresponds to a predetermined threshold height that is less than a height of the initial region.

22. The method of claim 18, wherein the one or more attributes correspond to one or more wait conditions associated with the at least one intersection.

23. The method of claim 18, further comprising:

receiving third data representative of a distance value corresponding to a distance to the at least one intersection; and based at least on the third data, associating the distance value with at least one pixel of the image data;

wherein the training the one or more neural networks is further based at least on the distance value.

24. The method of claim 23, wherein:

the image sensor is associated with an ego-object; and the third data is automatically generated based at least on motion data representative of motion of the ego-object from a first location at a time of capturing the image data to a second location corresponding to the at least one intersection.

25. A system comprising:

one or more processing units to:

apply, to one or more neural networks, image data representative of one or more intersections;

compute, using the one or more neural networks and based at least on the image data, output data including:

first data representative of a confidence that at least one pixel of the image data corresponds to at least one of the one or more intersections;

second data representative of location information corresponding to a bounding shape associated with at least one of the one or more intersections; and third data representative of a distance to at least one of the one or more intersections;

determine one or more final bounding shape locations of one or more final bounding shapes corresponding to the one or more intersections based at least on the first data and the second data;

determine one or more distances to the one or more intersections based at least on the third data; and perform one or more operations by a vehicle based at least on the one or more final bounding shape locations and the one or more distances.

* * * * *